US010473324B2

(12) United States Patent
Schubert et al.

(10) Patent No.: US 10,473,324 B2
(45) Date of Patent: Nov. 12, 2019

(54) INFRARED AGRICULTURAL HEATER

(71) Applicant: Roxell USA, Inc., Milford, IN (US)

(72) Inventors: Henry C. Schubert, Neosho, MO (US); Michael Osterman, Rogers, AR (US); Robert W. Hopper, Goodman, MO (US); Scott Robertson, Bentonville, AR (US)

(73) Assignee: ROXELL USA, INC., Milford, IN (US)

( * ) Notice: Subject to any disclaimer, the term of this patent is extended or adjusted under 35 U.S.C. 154(b) by 200 days.

(21) Appl. No.: 15/802,654

(22) Filed: Nov. 3, 2017

(65) Prior Publication Data

US 2018/0119946 A1 May 3, 2018

Related U.S. Application Data

(60) Provisional application No. 62/417,153, filed on Nov. 3, 2016.

(51) Int. Cl.
*F23C 3/00* (2006.01)
*A01K 31/20* (2006.01)
*F23D 14/12* (2006.01)

(52) U.S. Cl.
CPC ............ *F23C 3/002* (2013.01); *A01K 31/20* (2013.01); *F23D 14/12* (2013.01); *F23D 2203/005* (2013.01); *F23D 2900/14121* (2013.01)

(58) Field of Classification Search
CPC ............ F23D 14/12; F23D 2203/002; F23D 2203/005; F23D 2900/14121; F23C 3/002; F23C 2900/03009; A01K 31/20
See application file for complete search history.

(56) References Cited

U.S. PATENT DOCUMENTS

| | | | | |
|---|---|---|---|---|
| 2,439,038 A | * | 4/1948 | Cartter | F24C 3/042 126/91 A |
| 2,980,104 A | | 4/1961 | Patrick et al. | |
| 3,204,683 A | | 9/1965 | Ruff et al. | |
| 3,265,057 A | * | 8/1966 | Horne | F24C 3/042 126/92 B |

(Continued)

FOREIGN PATENT DOCUMENTS

| | | | |
|---|---|---|---|
| EP | 0514930 A2 * | 11/1992 | ............ F23D 14/12 |
| WO | 2018093581 A2 | 5/2018 | |

OTHER PUBLICATIONS

PCT/US2017/059842; dated Aug. 9, 2018; Patent Cooperation Treaty; International Search Report; Written Opinion of the International Searching Authority; 6 pages.

*Primary Examiner* — David J Laux
(74) *Attorney, Agent, or Firm* — Clark Hill PLC

(57) ABSTRACT

An infrared heater for use in an agricultural setting, particular for use in poultry houses, is provided that includes a burner assembly supported by an opposing pair of generally T-shaped end plates. The heater further includes a pair of emitter assemblies having a parabolic configuration that are each supported by an elongated emitter support. The emitter assemblies surround an inner core member assembly that in part define burn chambers. The heater includes a pair of end deflector members that together with the parabolic inner surfaces of the emitter assemblies direct infrared heat outwardly and downwardly in a wide and generally quadrilaterally shaped heat footprint.

14 Claims, 23 Drawing Sheets

(56) References Cited

U.S. PATENT DOCUMENTS

| | | | | |
|---|---|---|---|---|
| 3,307,529 | A | * | 3/1967 | Fannon, Jr. ............. F23C 99/00 |
| | | | | 126/92 B |
| 3,310,047 | A | | 3/1967 | Budden |
| 3,805,763 | A | * | 4/1974 | Cowan ................... F23D 14/14 |
| | | | | 126/92 R |
| 4,319,125 | A | * | 3/1982 | Prince ...................... F24C 1/10 |
| | | | | 126/92 B |
| 4,390,125 | A | * | 6/1983 | Rozzi ...................... F23N 5/245 |
| | | | | 126/92 AC |
| 4,504,011 | A | * | 3/1985 | Farrell ................... A01K 31/20 |
| | | | | 119/304 |
| 5,139,415 | A | * | 8/1992 | Schwank ................ F23D 14/14 |
| | | | | 126/92 AC |
| 5,474,517 | A | | 12/1995 | Falk et al. |
| 5,626,125 | A | * | 5/1997 | Eaves ....................... F24D 5/08 |
| | | | | 126/91 A |
| 7,654,257 | B2 | * | 2/2010 | Vancak ................... F23C 3/002 |
| | | | | 126/91 A |
| 8,166,964 | B2 | * | 5/2012 | Longueville ........... A01K 31/19 |
| | | | | 126/116 B |
| 8,656,904 | B2 | * | 2/2014 | Wortman ................. F24D 5/08 |
| | | | | 126/91 A |
| 2007/0199564 | A1 | | 8/2007 | Longueville et al. |

\* cited by examiner

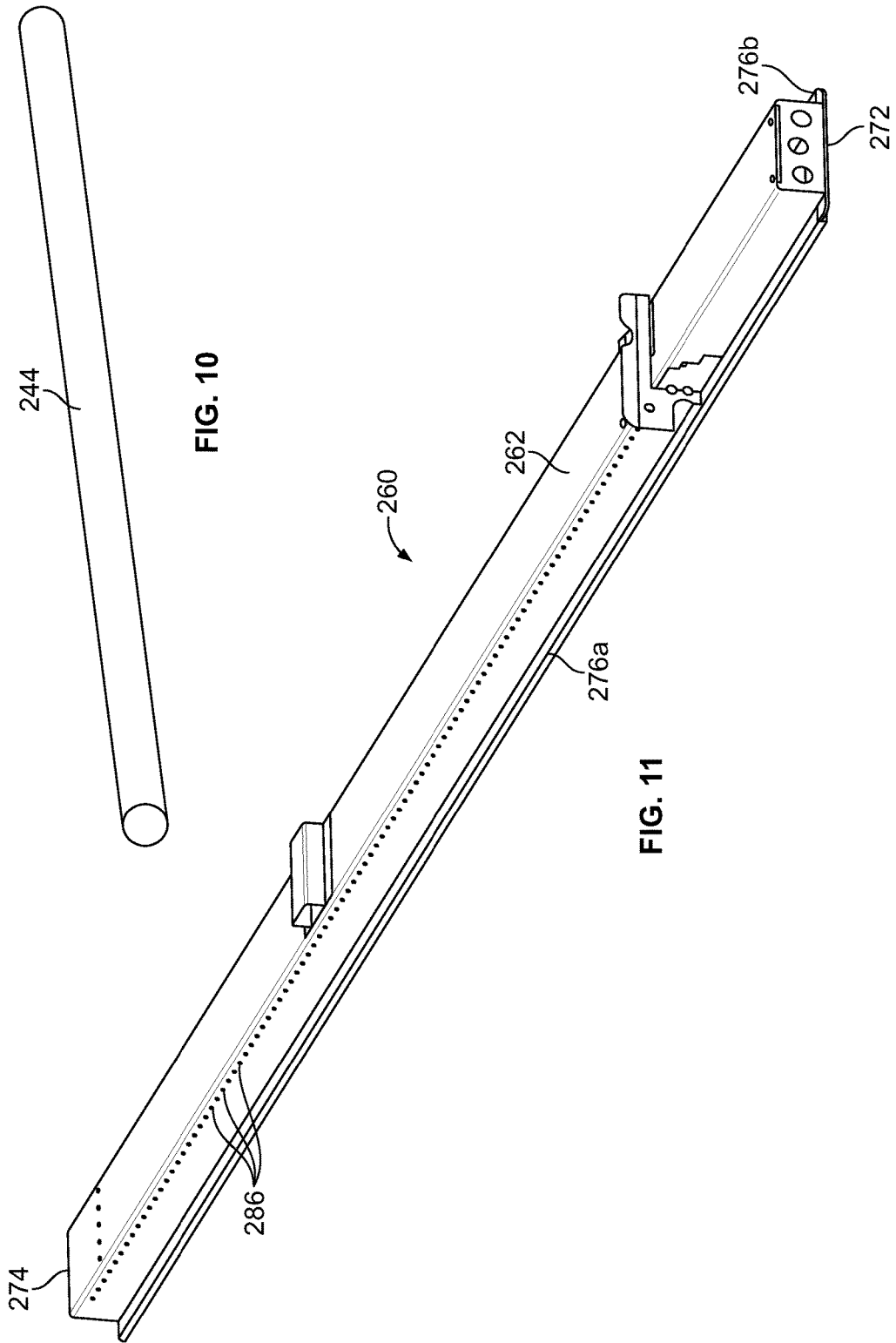

INFRARED AGRICULTURAL HEATER

CROSS REFERENCE TO RELATED APPLICATIONS

This application claims the benefit of domestic priority of U.S. Provisional Patent Application No. 62/417,153, filed Nov. 3, 2016, and entitled "INFRARED AGRICULTURAL HEATER". U.S. Provisional Patent Application Ser. No. 62/417,153 is hereby incorporated by reference in its entirety.

FIELD OF THE INVENTION

The invention relates in general to infrared heaters. More specifically, this invention relates to infrared heaters for use in agricultural settings, such as agricultural houses for raising poultry and the like.

BACKGROUND AND SUMMARY OF THE INVENTION

Infrared heat has been widely adapted over forced air heat in the environment of a poultry house primarily because radiant heat more efficiently provides heat directly to the floor without the need to heat the entire air space enclosed by the walls and the ceiling of the poultry house. In the past, radiant heat has been provided in poultry houses utilizing propane or natural gas-fired heaters in: (a) a circular shape with a ceramic disc to create a small percentage of its input as infrared heat (commonly referred to as a "pancake brooder"); (b) a circular shaped perforated emitter (commonly referred to as a "radiant brooder"); (c) a rectangular shaped heater with a relatively open design (commonly referred to as a "ceramic brooder"), of the type manufactured by SBM International, which is positioned at an angle in order to direct heat angularly downwardly toward the floor; or (d) in the shape of a long tubular pipe (commonly referred to as a "tube heater").

One disadvantage associated with these different types of radiant heaters is the production of heat patterns that create large hot areas and large first and second cold areas of the floor. Birds in a poultry house during the brood time perform best within a fifteen (15) degree temperature spread ("the comfort zone") on the floor. The comfort zone is typically between approximately eighty-five and one hundred degrees (85°-100°) Fahrenheit. The hot areas are typically those areas above approximately one-hundred degrees (100°) Fahrenheit. The first cold areas are typically those areas between approximately eighty and eighty-five degrees (80°-85°) Fahrenheit. The second cold areas are typically those areas below approximately eighty degrees (80°) Fahrenheit. The greater percentage of infrared heat output that is put on the floor within the comfort zone, the more efficient the heater is.

The foregoing was discussed in U.S. Pat. No. 8,166,964, entitled "Heater For Use In An Agricultural House", the entirety of which is incorporated herein by reference. The heater described and claimed in U.S. Pat. No. 8,166,964 provided a heater for use in a poultry house that, as compared to the known prior art heaters at the time, reduced the hot and cold areas on the floor of the poultry house, and increased the size of the comfort zone on the floor of the poultry house.

Despite the benefits and improvements provided and achieved by the heater described and claimed in U.S. Pat. No. 8,166,964, the heater of the present invention provides even further benefits and improvements.

DETAILED DESCRIPTION OF THE DRAWINGS

FIG. 10 is a perspective view of one of the support rod components of the heater of the present invention FIG. 11 is a perspective view of the burner assembly component of the heater of the present invention;

DETAILED DESCRIPTION OF THE ILLUSTRATED EMBODIMENTS

Figure 1:
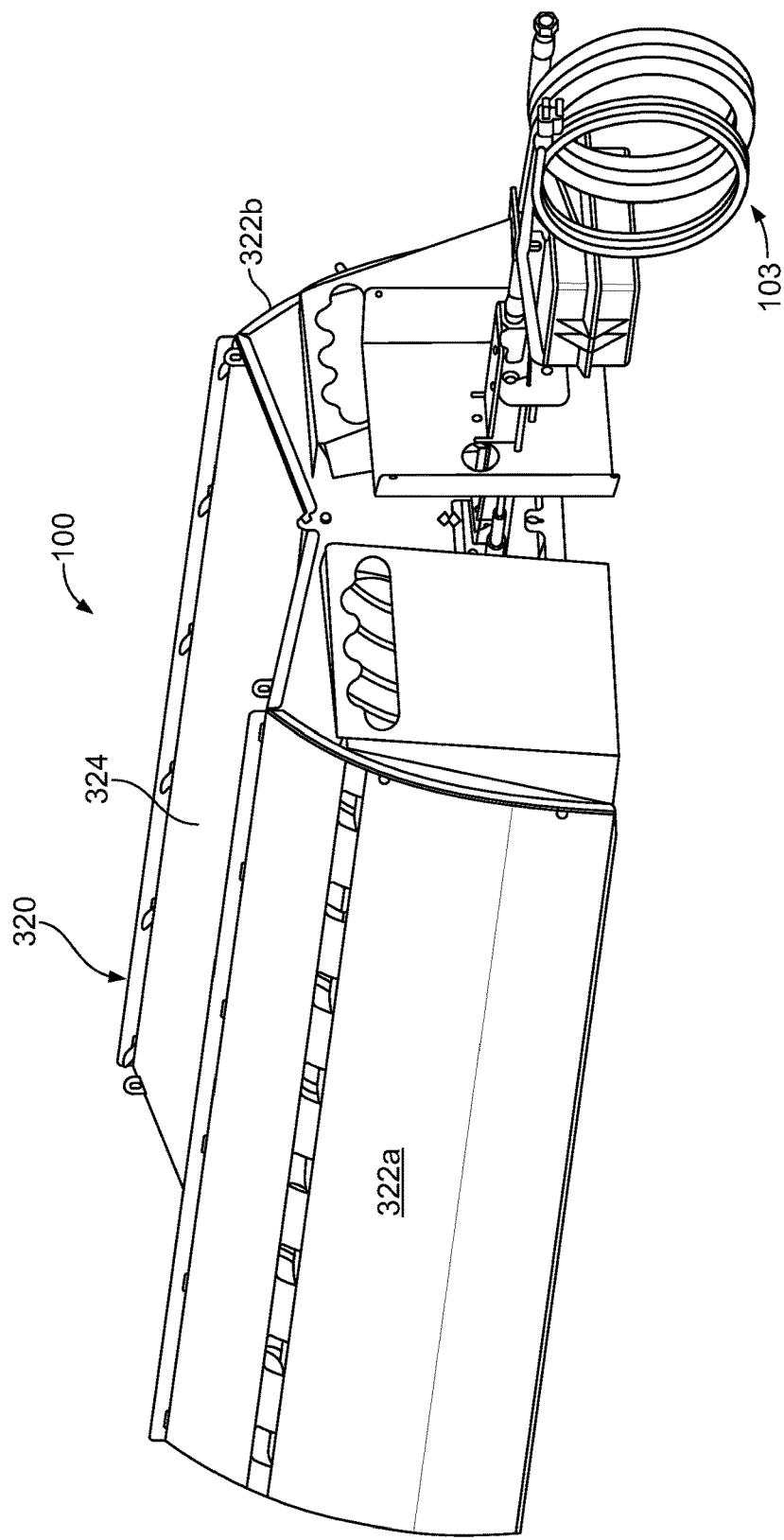
FIG. 1 is a perspective view of the agricultural heater of the present invention.

While the invention may be susceptible to embodiment in different forms, there is shown in the drawings, and herein will be described in detail, specific preferred embodiments with the understanding that the present disclosure is to be considered an exemplification of the principles of the invention, and is not intended to limit the invention to that as illustrated and described herein.

Figure 2:
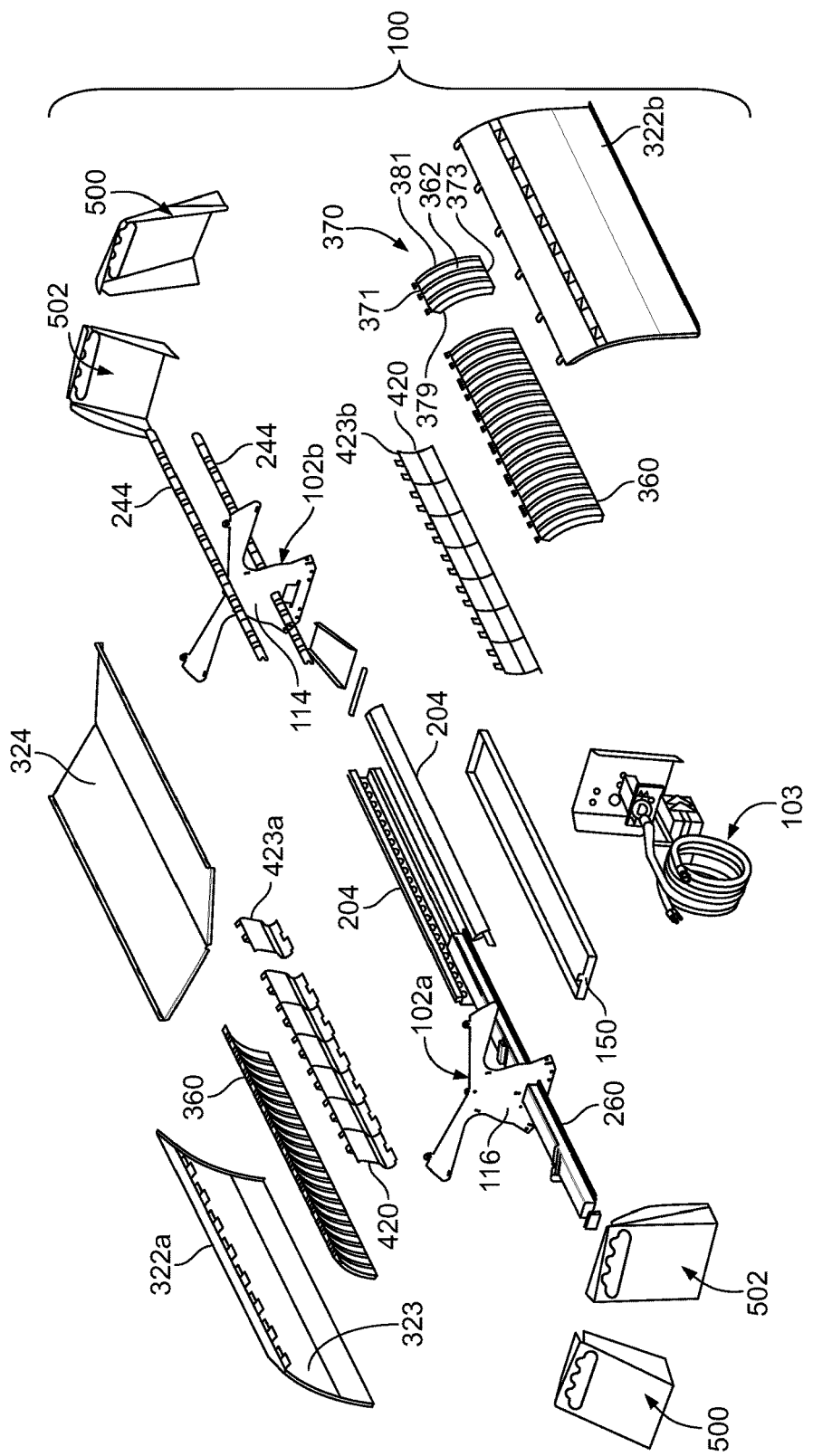
FIG. 2 is an exploded perspective view showing various components of the agricultural heater of the present invention.
Figure 8:
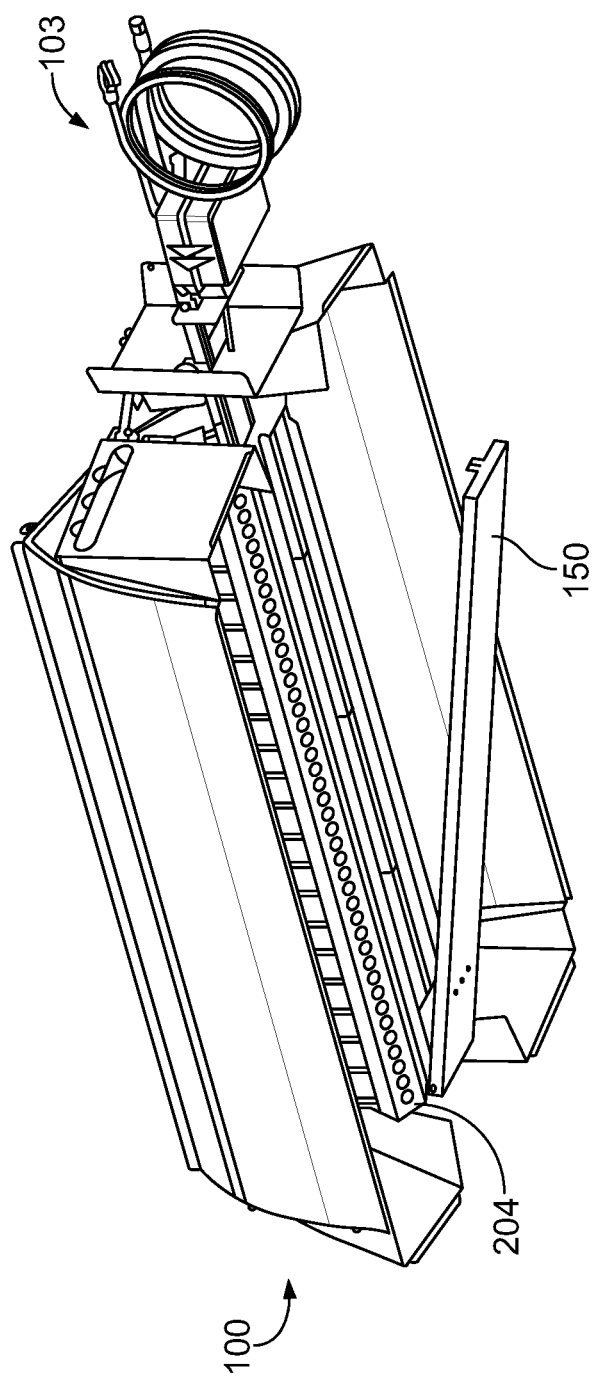
FIG. 8 is a bottom perspective view of the heater showing the operation of the hinged bottom pan component.
Figure 9:
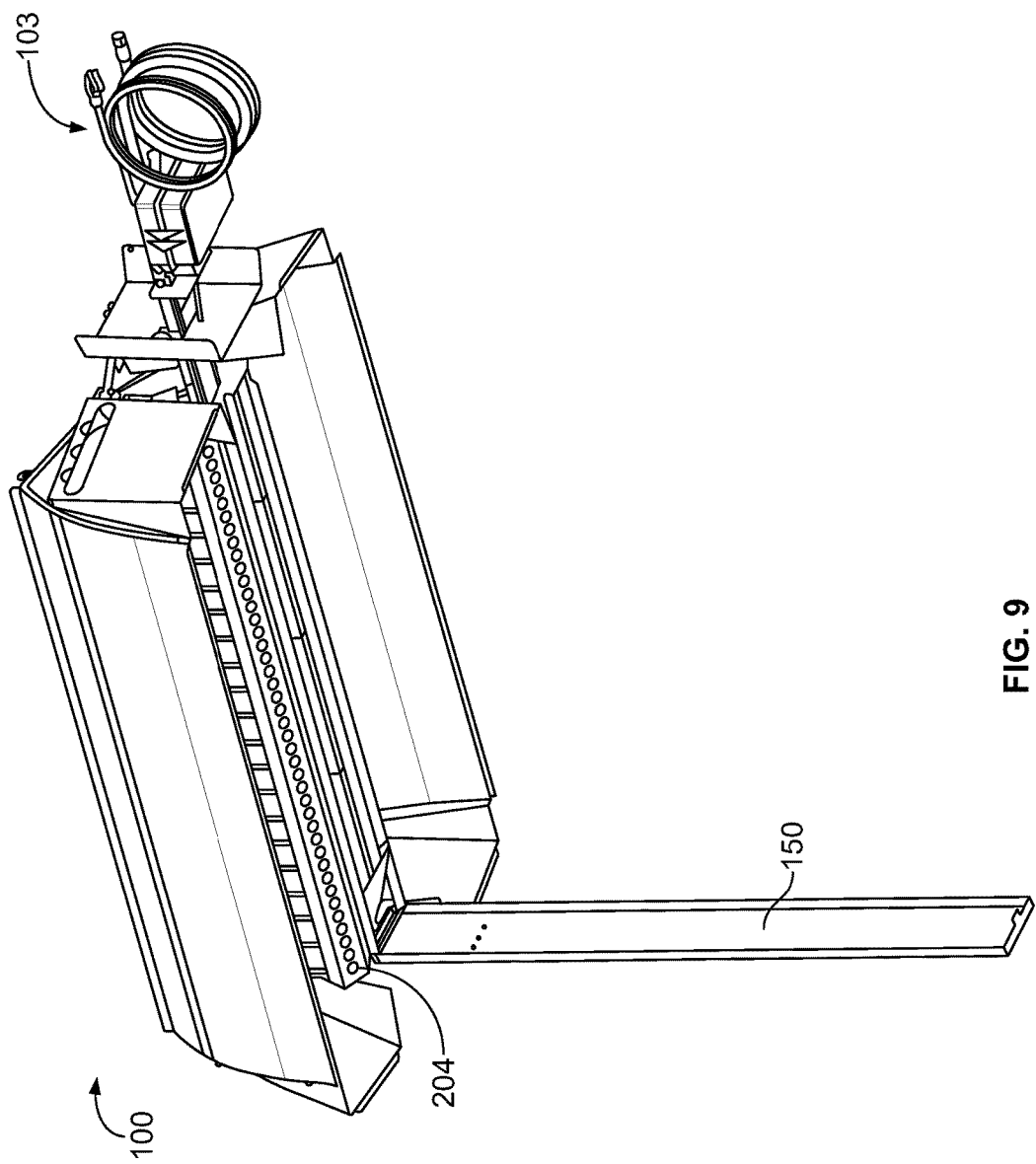
FIG. 9 is an alternate bottom perspective view of the heater showing the hinged bottom pan component in a completely lowered position.
Figure 12:
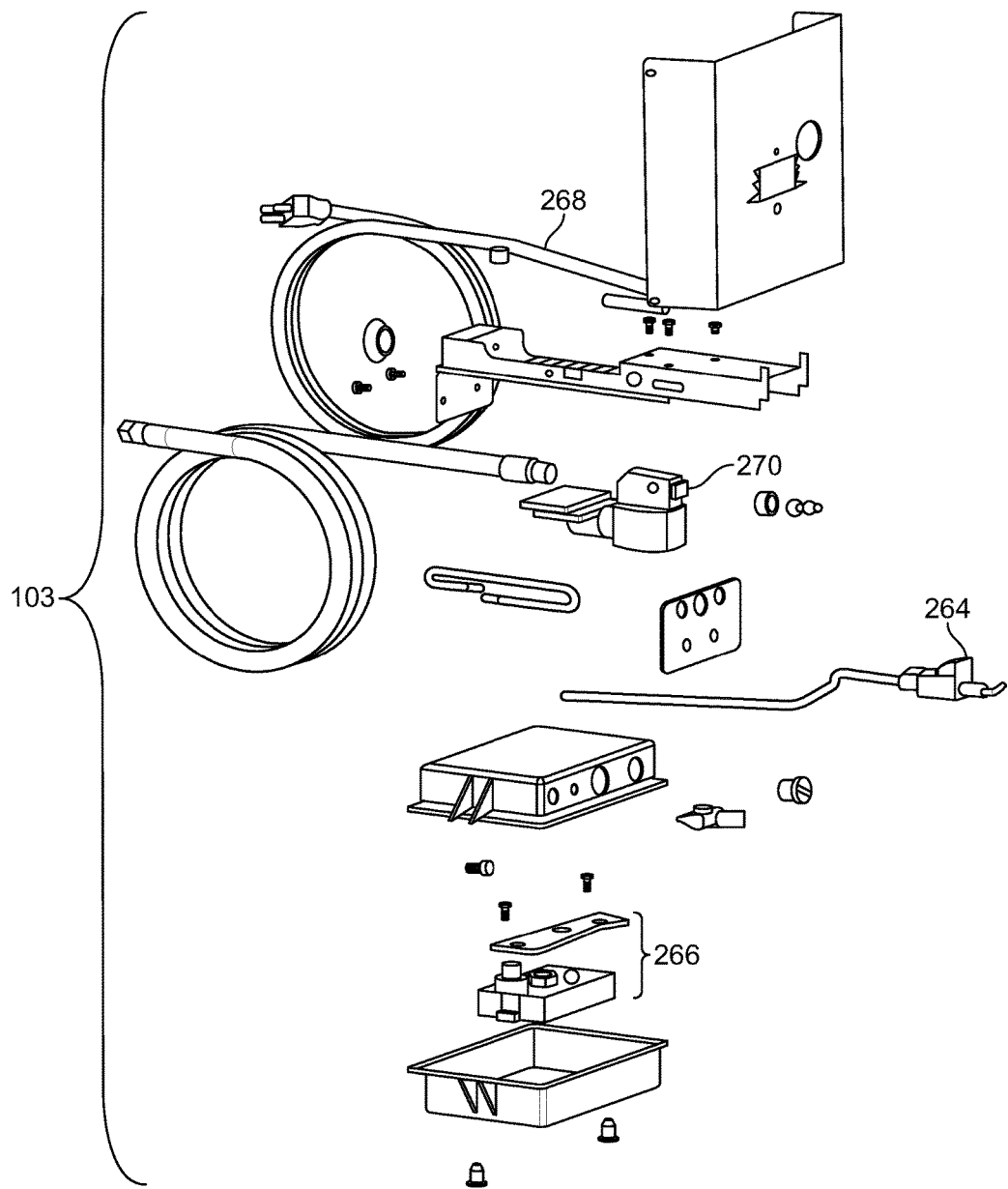
FIG. 12 is an exploded view of an exemplary igniter and control system for use with the heater of the present invention.
Figure 13:
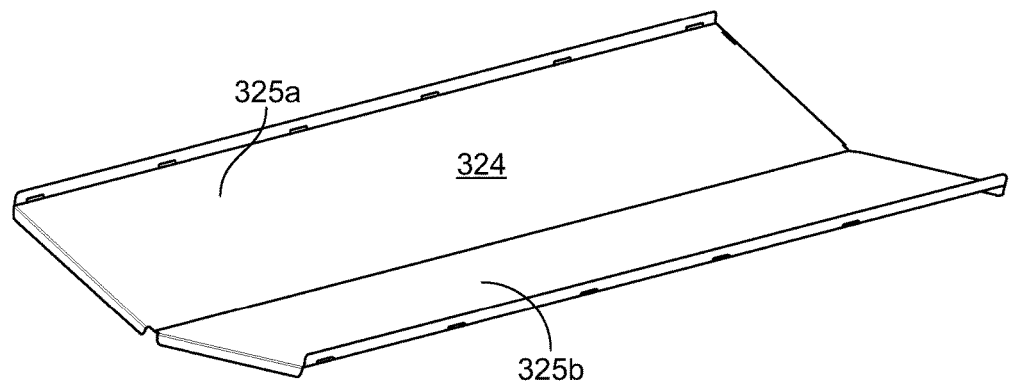
FIG. 13 is a top perspective view of the top panel of the canopy assembly of the heater of the present invention.
Figure 14:
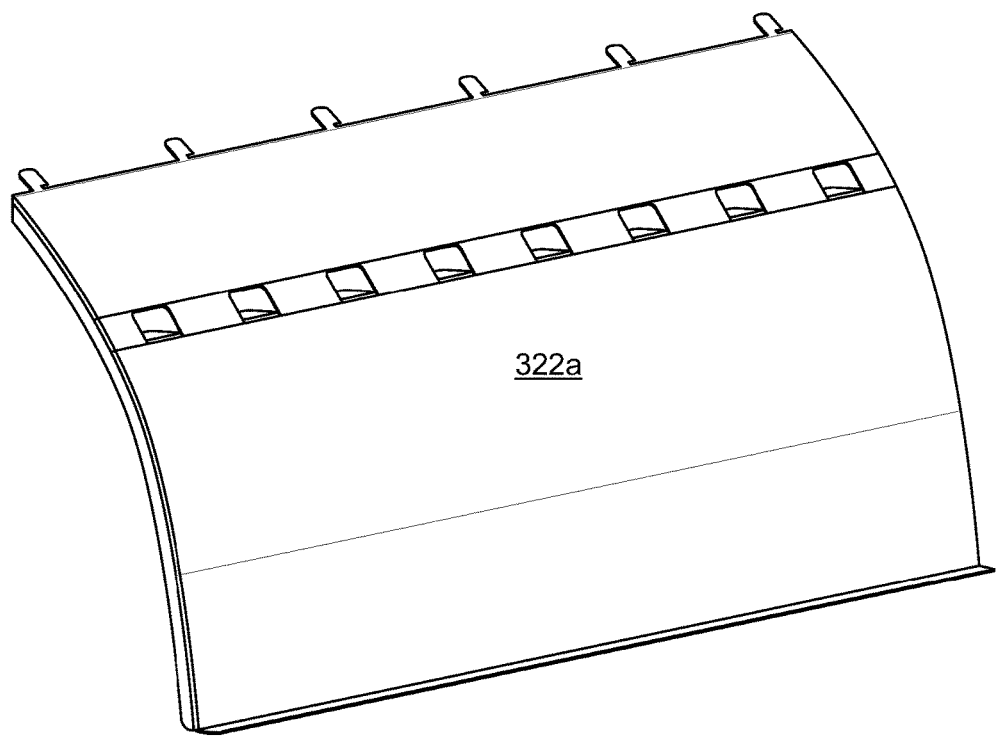
FIG. 14 is a perspective view of one of the side panels of the canopy assembly of the heater of the present invention.

An exemplary embodiment of a heater 100 which incorporates features of the invention is shown generally in FIGS. 1-2 and 8-9. Specifically, FIGS. 1 and 8-9 show perspective views of the entire assembled heater while FIG. 2 is an exploded view showing many of the elements of the heater and their relative locations when said heater is assembled and installed. These and other individual parts that form the heater 100 will now be described in greater detail.

Figure 3:
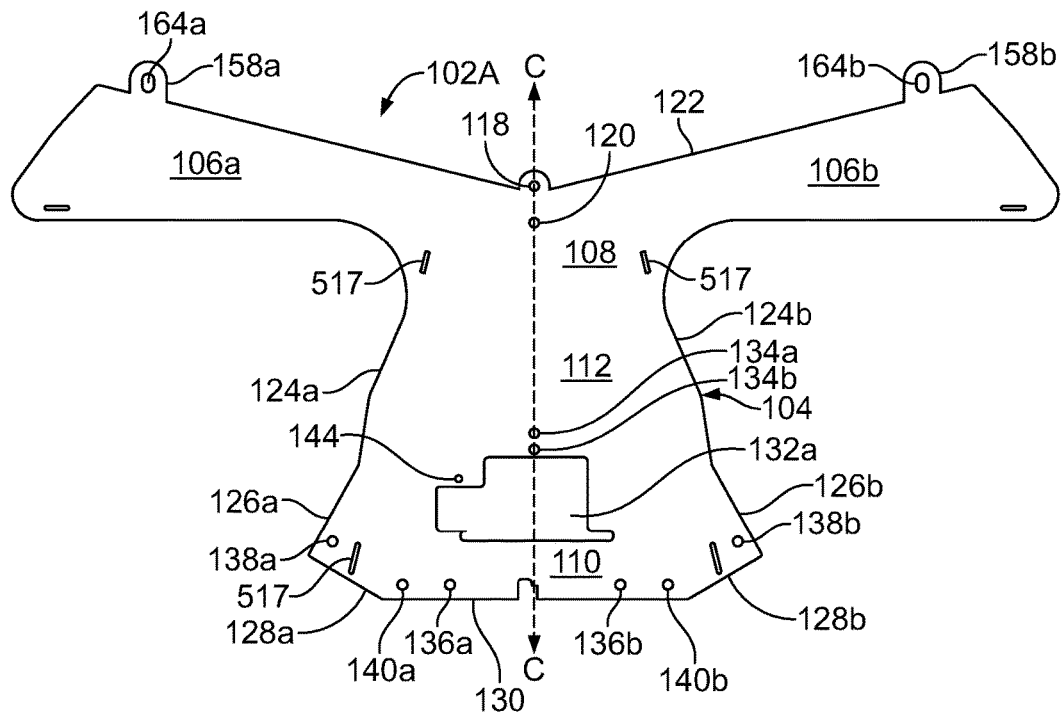
FIG. 3 is a front view of one of the end plate components of the heater of the present invention.
Figure 4:
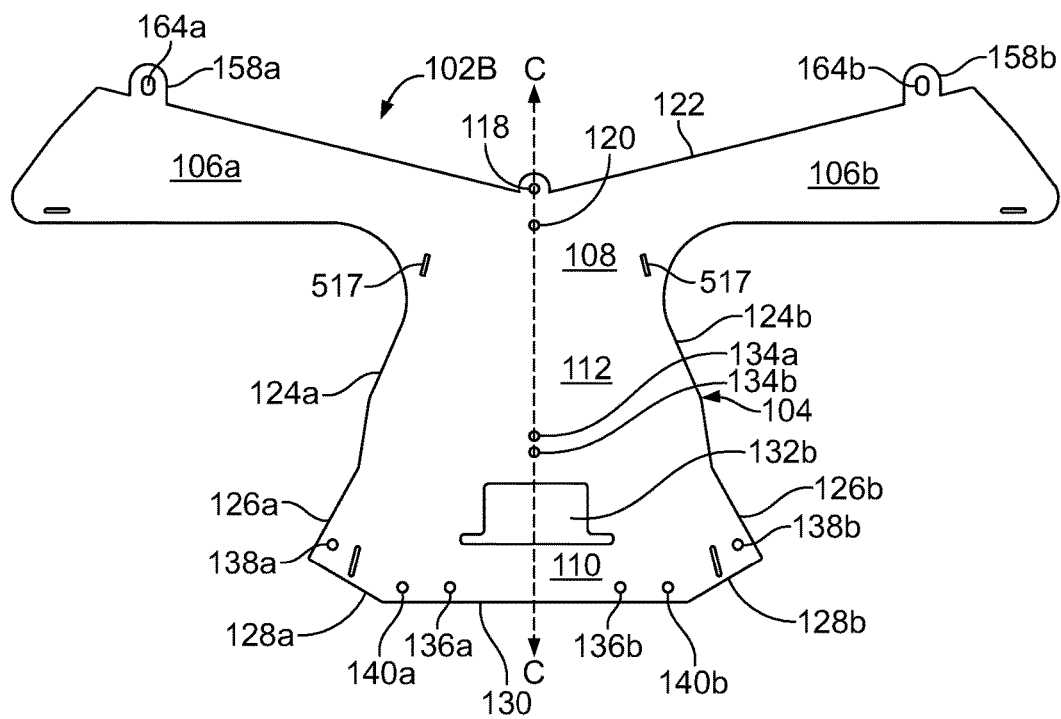
FIG. 4 is a front view of the other end plate component of the heater of the present invention.

As best shown in FIGS. 2-4, the heater 100 preferably comprises a pair of oppositely disposed end plates 102a and 102b which are each preferably identical to one another in shape and size with some minor differences with respect to sizes of some of the apertures as seen in FIGS. 3-4. FIG. 3 shows a first end plate 102a that, as will be shown in detail herein, is the end plate 102a that is disposed near an end of the heater 100 closest to an igniter and control assembly 103. FIG. 4 shows a second end plate 102b that is disposed near the end of the heater furthest from the igniter and control assembly 103.

Each end plate 102a and 102b is preferably formed of metal, preferably stainless steel. As best illustrated in FIGS. 3-4 each end plate 102a and 102b is generally T-shaped as it has a center portion 104 and a pair of arm portions 106a, 106b extending outwardly therefrom. Although a preferred configuration of the end plates is described, it should be appreciated that the other alternative shapes of the end plates are contemplated that are generally t-shaped and that provide a similar functionality of the specific end plates described herein.

The center portion 104 is preferably generally defined by an upper portion 108, a lower portion 110, and a middle portion 112, with the arm portions 106a, 106b extending outwardly from the upper portion 108. A centerline C-C is provided through the center portion 104 and each side of the end plate 102 is preferably a mirror image of the other side about the centerline C-C, with respect to shape and size. The end plate 102 has an inner surface 114 and an outer surface 116.

The upper portion 108 of the center portion 104 has a pair of apertures 118, 120 provided therethrough, with each aperture 118, 120 preferably being disposed along the centerline C-C. The apertures 118, 120 are more preferably circular in configuration. The aperture 118 is provided along an upper edge 122 of the end plate 102 while the aperture 120 is provided below, and spaced from, the aperture 118.

The middle portion 112 of the center portion 104 has a pair of side edges 124a, 124b which, from the connection of the middle and upper portions 112, 108 to the connection of the middle and lower portions 112, 110, generally curves in partially outwardly and then inwardly, generally in a parabolic configuration, as illustrated in FIGS. 3-4. It is to be understood that the side edges 124a, 124b need not actually be continuously curved edges, but rather may be formed of a plurality of straight edges joined together to provide the generally curved appearance of the side edges 124a, 124b. Regardless, the area where the middle and upper portions 112, 108 connect is preferably more narrow than is the width of the area of connection of the middle and lower portions 112, 110.

From the connection of the middle and lower portions 112, 110, a first pair of side edges 126a, 126b of the lower portion 110 extend outwardly and downwardly to a second pair of side edges 128a, 128b of the lower portion 110 which, in turn, extend inwardly and downwardly to a bottom edge 130 of the lower portion 110. The connection of the first pair of side edges 126a, 126b to the second pair of side edges 128a, 128b is preferably positioned further from the centerline C-C than is any point of the side edges 124a, 124b of the middle portion 112.

As shown in FIG. 3, an aperture 132a for supporting a burner assembly which will be described herein is provided along the centerline C-C which is partially provided in the middle portion 112 and which is partially provided in the lower portion 110. The aperture 132a is preferably of the shape depicted in FIG. 3, but it should be appreciated that the aperture 132a can be essentially any shape that is complementary to the burner assembly and a portion of the igniter and control assembly 103 to be supported therein. Similarly, as shown in FIG. 4, an aperture 132b for supporting a burner assembly is provided along the centerline C-C which is partially provided in the middle portion 112 and which is partially provided in the lower portion 110. The aperture 132b is preferably "hat" shaped as depicted in FIG. 4, but it should be appreciated that the aperture 132b can be essentially any shape that is complementary to the burner assembly to be supported therein.

The middle portion 112 of the center portion 104 preferably has additional apertures 134a, 134b provided therethrough, with the apertures 134a and 134b being provided along the centerline C-C. The apertures 134a and 134b are preferably circular in configuration and preferably of the same diameter as the apertures 118, 120. The apertures 134a and 134b are provided above, and spaced apart from, the apertures 132a and 132b, as viewed in FIGS. 3 and 4.

The lower portion 110 of the center portion 104 has a pair of apertures 136a, 136b provided therethrough, with the aperture 136a being provided to the left of the centerline C-C and the aperture 136b being provided to the right of the centerline C-C, as viewed in FIG. 3. The apertures 136a, 136b are preferably circular in configuration and preferably have the same diameter as the apertures 118, 120. The apertures 136a, 136b are provided below, and spaced apart from, the apertures 132a and 132b, as viewed in FIGS. 3 and 4.

The lower portion 110 of the center portion 104 has a pair of apertures 138a, 138b provided therethrough, with the aperture 138a being provided to the left of the centerline C-C and the aperture 138b being provided to the right of the centerline C-C, as viewed in FIGS. 3 and 4. The apertures 138a, 138b are preferably circular in configuration and preferably have the same diameter as the apertures 118, 120. The apertures 138a, 138b are provided proximate to the connection of the first side edges 126a, 126b to the second side edges 128a, 128b.

The lower portion 110 of the center portion 104 has a pair of apertures 140a, 140b provided therethrough, with the aperture 140a being provided to the left of the centerline C-C and the aperture 140b being provided to the right of the centerline C-C, as viewed in FIGS. 3 and 4. The apertures 140a, 140b are preferably circular in configuration and have the same diameter as the apertures 118, 120. The apertures 140a, 140b are provided proximate to the connection of the second side edges 128a, 128b to the bottom edge 130.

An aperture 144 is provided proximate to the aperture 132a as viewed in FIG. 3 The aperture 144 is provided in the middle portion 112 of the center portion 104 of the end plate 102a. The aperture 144 is preferably circular in configuration and is preferably smaller in diameter than the apertures 118, 120.

As explained, the arm portions 106a, 106b are preferably mirror images of one another about the centerline C-C. Each arm portion 106a, 106b extends outwardly from the upper portion 108 of the center portion 104 in a slightly upwardly manner.

Each arm portion 106a, 106b has an upwardly extending portion 158a, 158b. The upwardly extending portion 158a, 158b extends further upwardly than the upper edge of the arm portions 106a, 106b, and is preferably rounded at its upper end. An aperture 164a or 164b is provided through a corresponding upwardly extending portion 158a or 158b. The apertures 164a, 164b are preferably oblong, or "racetrack" shaped in configuration.

Figure 5:
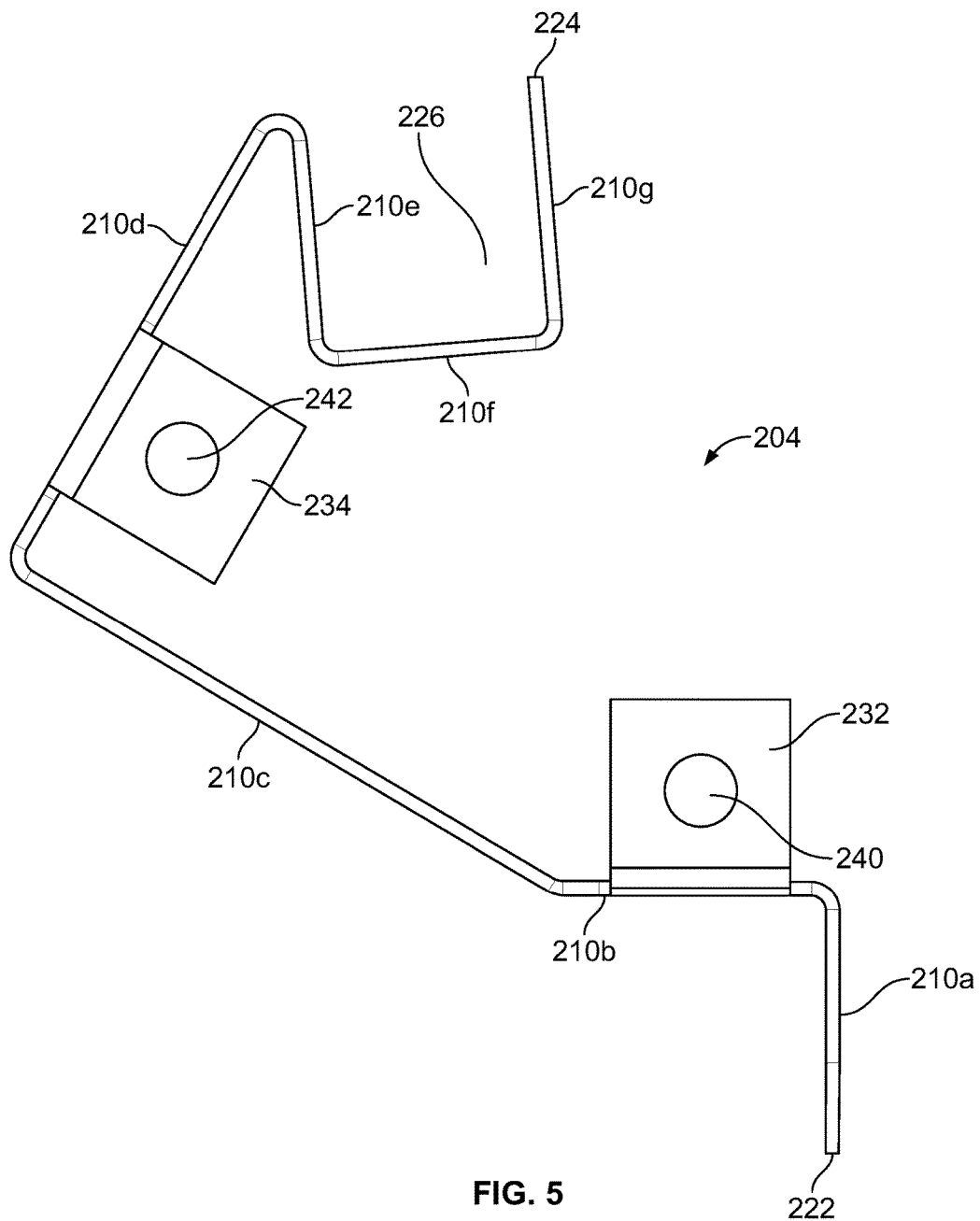
FIG. 5 is an end view of one of the emitter support components of the heater of the present invention.
Figure 6:
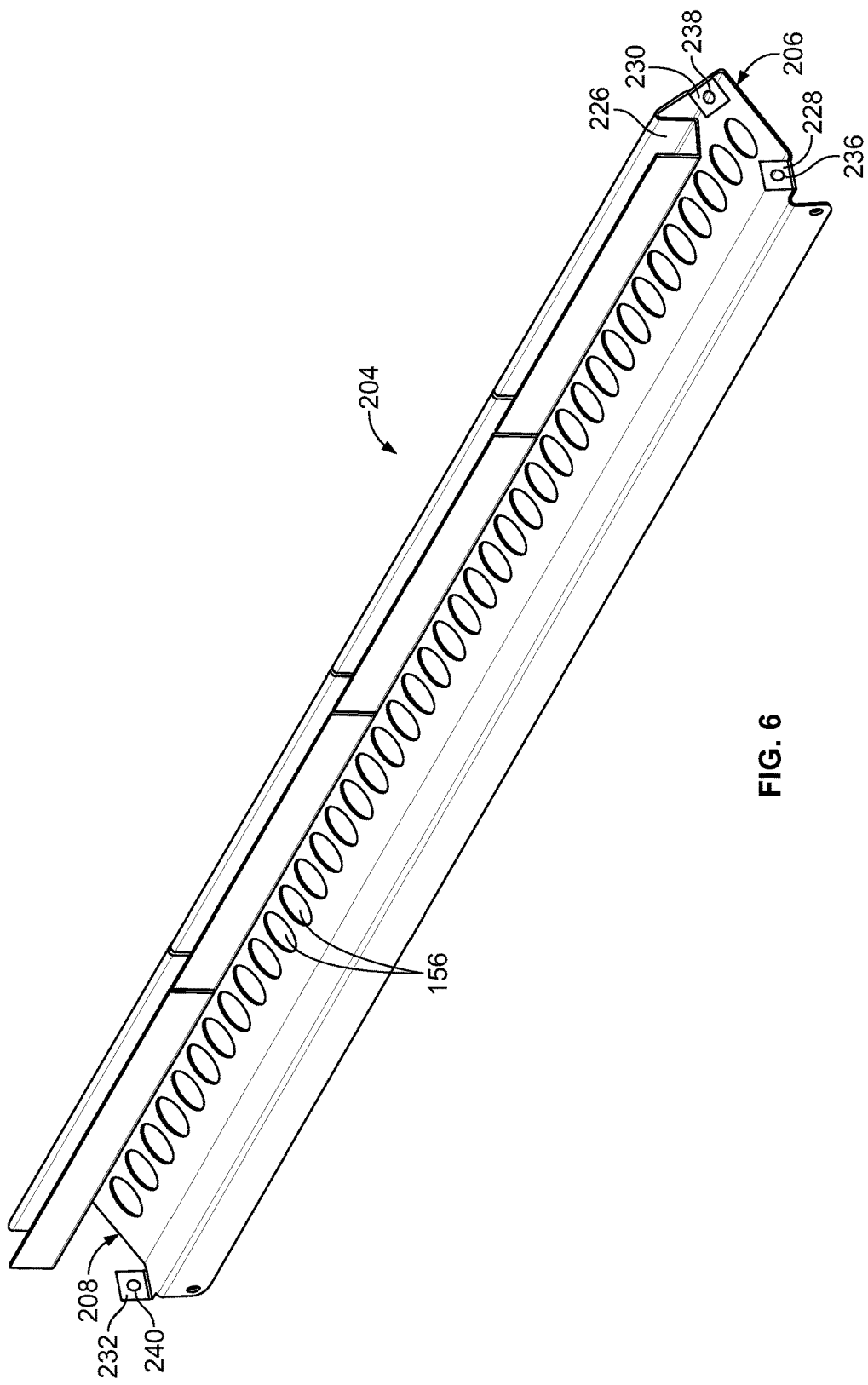
FIG. 6 is a top perspective view of one of the emitter support components of the heater of the present invention.
Figure 7:
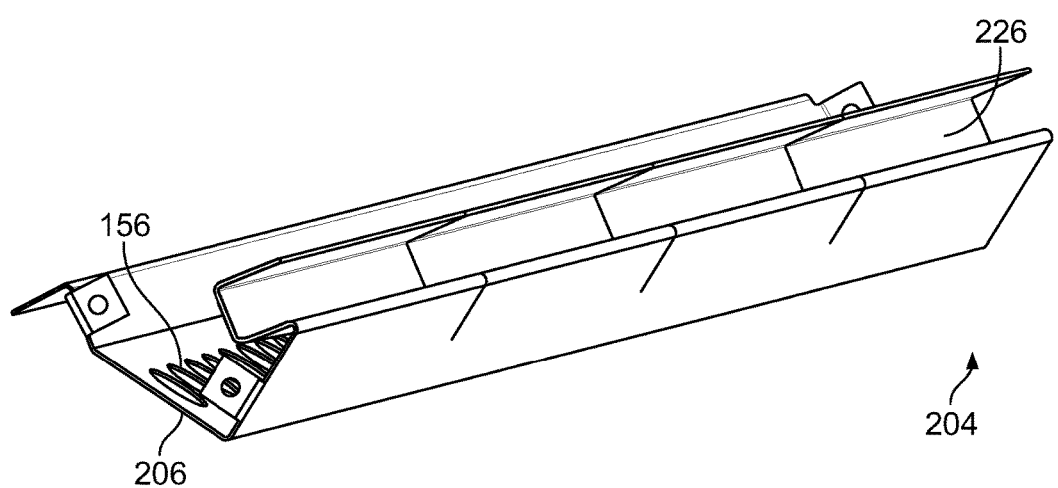
FIG. 7 is an alternate perspective view of one of the emitter support components of the heater of the present invention.

With reference to FIGS. 5-7, the heater 100 has a pair of emitter supports 204a, 204b (for reference, each emitter support will be identified by the reference numeral 204 in connection with the description of the structure thereof, with reference to FIGS. 5-7) which are each preferably identical to one another. Each emitter support 204 is a generally elongated piece of material, preferably made of metal, preferably stainless steel. Each emitter support 204 has a first end 206 and an opposite second end 208. The emitter support 204 preferably has first, second, third, fourth, fifth, sixth, and seventh portions 210a-210g extending from the first end 206 to the second end 208. The first portion 210a extends upwardly from a free edge 222 to the second portion 210b, which extends substantially perpendicularly and leftwardly from the first portion 210a to the third portion 210c, which extends angularly and upwardly and to the left to the fourth portion 210d, which extends angularly upwardly and to the right to the fifth portion 210e, which extends angularly downwardly and to the right to the sixth portion 210f, which extends perpendicularly and to the right to the seventh portion 210g, which extends perpendicularly and to the left to a free edge 224. The first and second portions 210a, 210b are preferably perpendicular to one another as are the third and fourth portions 210c, 210d, the fifth and sixth portions 210e, 210f, and the sixth and seventh portions 210f and 210g. The fifth and seventh portions 210e, 210g are preferably parallel to one another and again preferably perpendicular to the sixth portion 210f, such that a channel 226 is defined between the fifth, sixth and seventh portions 210e-g.

Tab 228 extends perpendicularly from the second portion 210b at the first end 206. Tab 230 extends perpendicularly from the fourth portion 210d at the first end 206 thereof. Likewise, tab 232 extends perpendicularly from the second portion 210b at the second end 208 thereof. Tab 234 extends perpendicularly from the fourth portion 210d at the second end 208 thereof. Each tab 228, 230, 232, 234 also has a corresponding aperture 236, 238, 240, 242 provided therethrough, where the apertures 236, 238, 240, 242 are preferably circular in configuration and are preferably of the same size as the apertures 138a, 138b, 140a, 140b provided through the end plates 102a, 102b. Preferably, third portion 210c includes a plurality of preferably evenly spaced apertures 156 along the length of the emitter support 204.

As best shown in FIGS. 8-9, the heater 100 further comprises a hingedly attached bottom pan member 150. This hinged arrangement allows for much easier access to the internal components of the assembled heater for maintenance and repair. Further, as will be described herein, it allows for the ease of installation of a burner assembly prior to heater installation.

Figure 15:
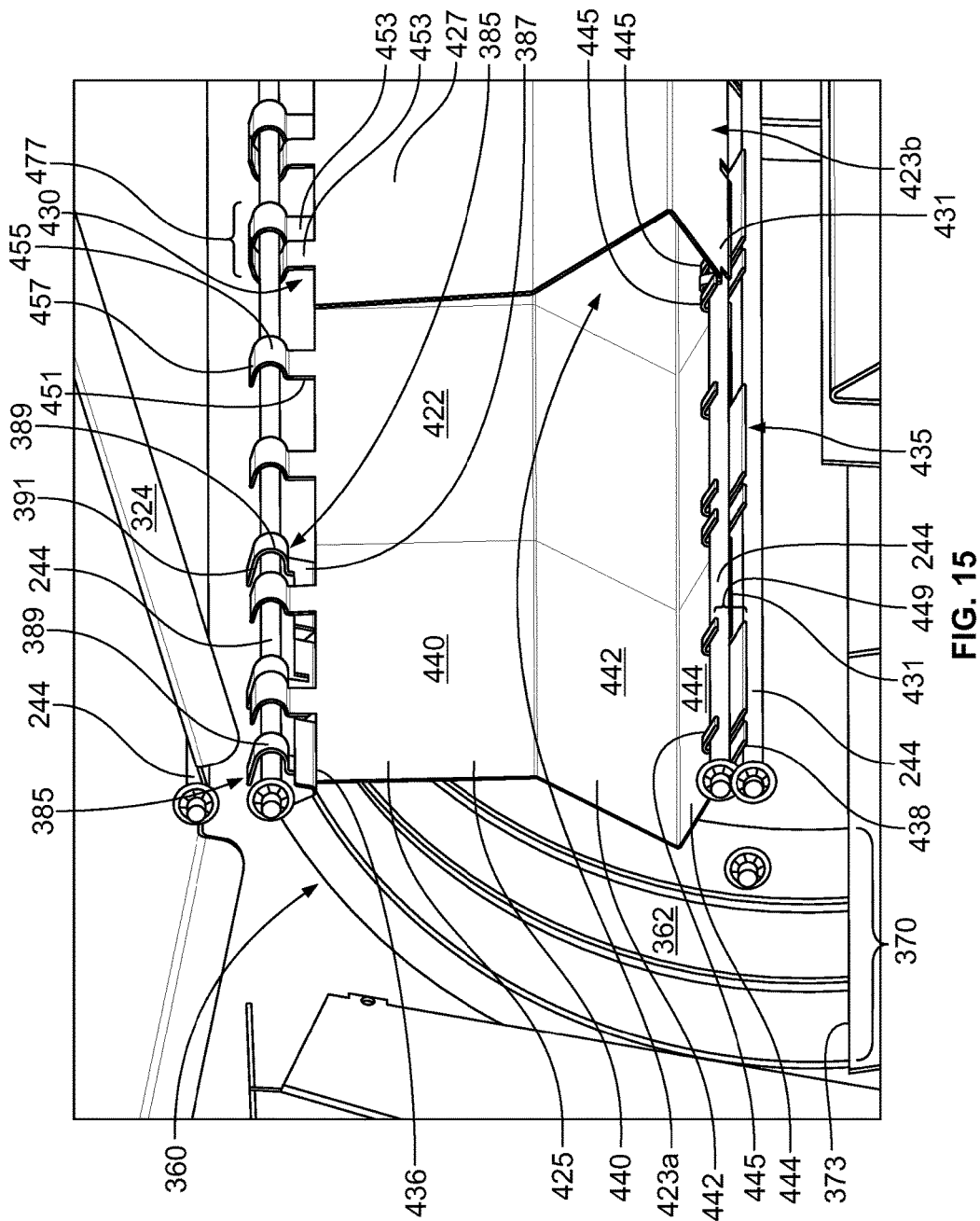
FIG. 15 is a partially cutaway side perspective view of the heater of the present invention.
Figure 16:
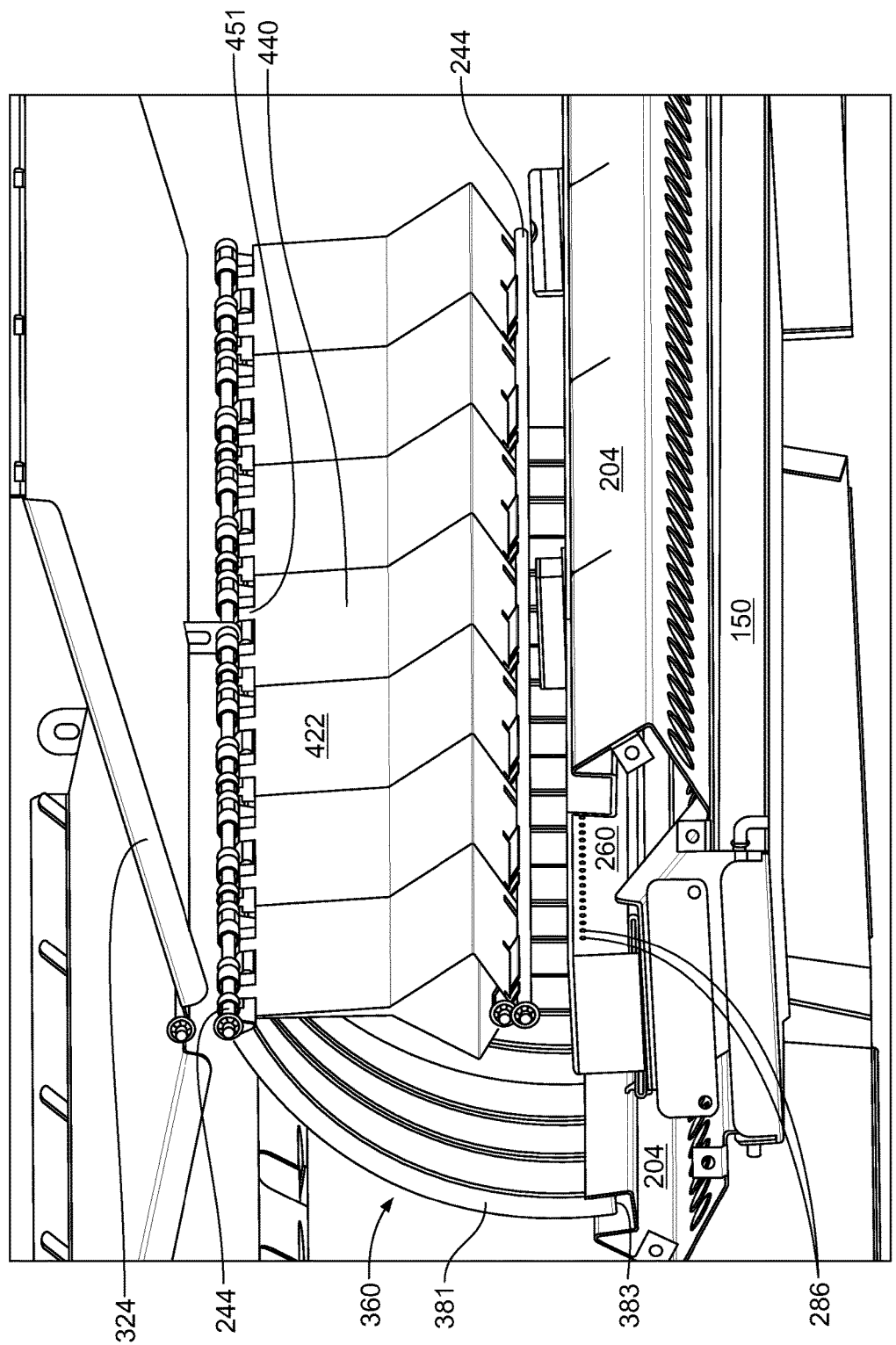
FIG. 16 is an alternate partially cutaway side perspective view of the heater of the present invention.
Figure 17:
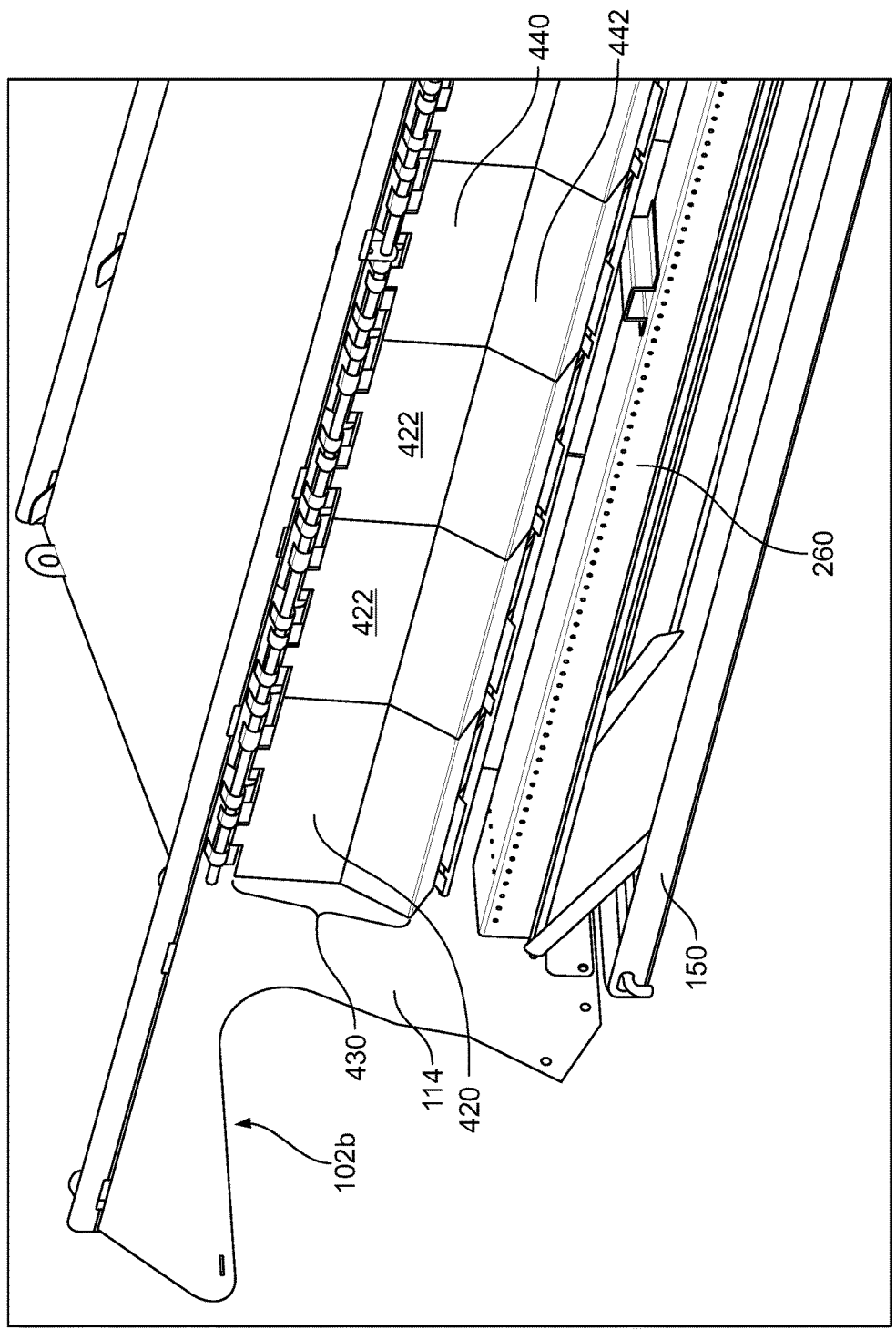
FIG. 17 is another alternate partially cutaway side perspective view of the heater of the present invention.

As shown in FIG. 10 and FIGS. 15-16 he heater 100 has one or more support and connecting rods 244. Each rod 244 is a generally elongated cylindrical piece of material, preferably made of metal, preferably stainless steel. Preferably, the heater includes four rods 244 each having a first and second end.

Figure 19:
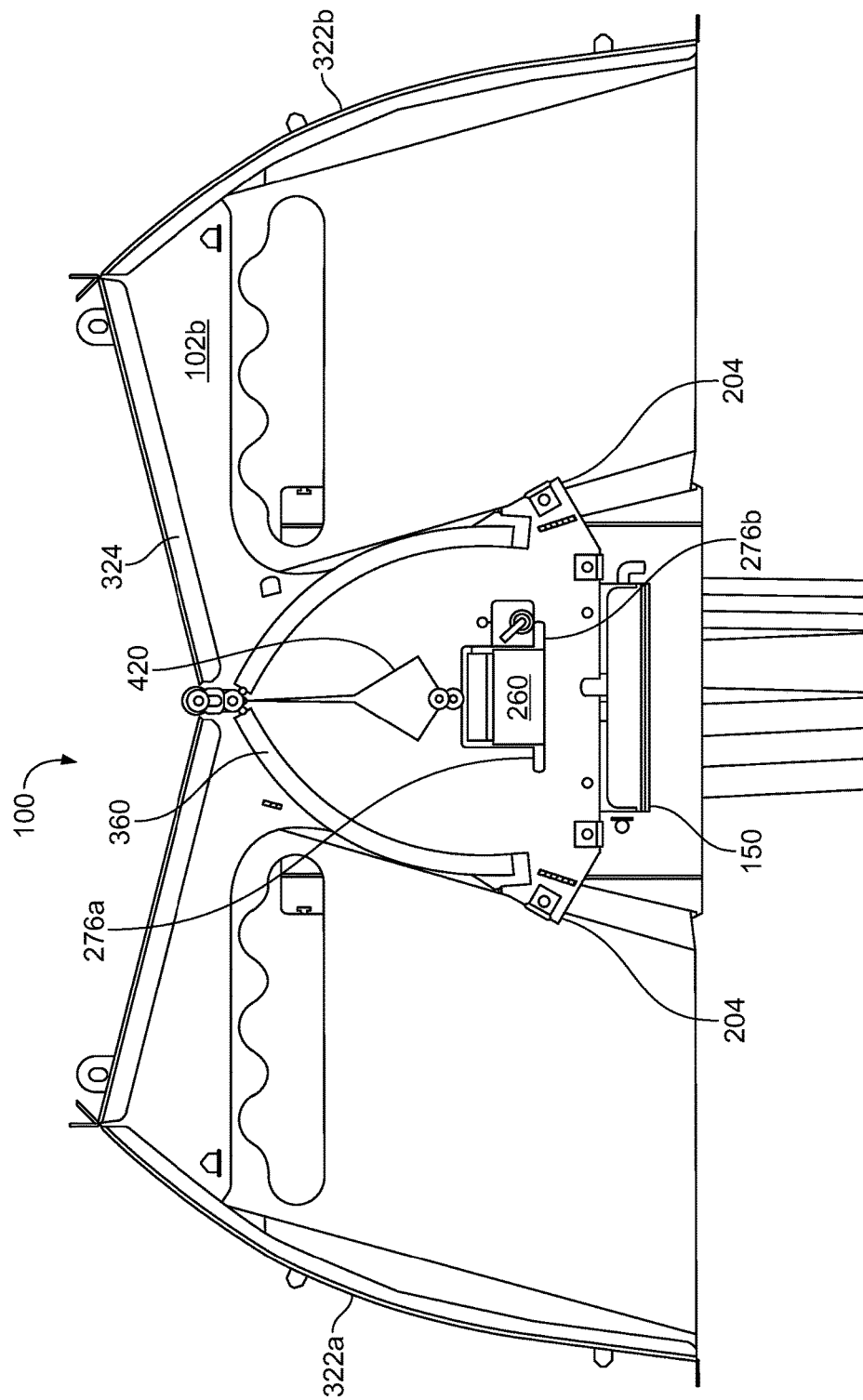
FIG. 19 is a partially cutaway end view of the heater of the present invention.

The heater 100 includes a burner assembly 260 as best shown in FIG. 4. The burner assembly 260 includes a burner 262 and the igniter and control assembly 103 that further comprises an igniter control 266, a connecting wire 268, and a gas control 270. The burner 262 is preferably a straight, elongated tube-like member with a substantially rectangular cross section having first and second opposite ends 272, 274. The burner 262 is preferably formed of a metal, preferably stainless steel. The burner 262 preferably is substantially of rectangular cross section to correspond with support apertures 132a, 132b in the end plates 102a, 102b. With reference to FIG. 19, The burner 262 also preferably includes a pair of longitudinally disposed support flanges 276a, 276b that further correspond to a portion of support apertures 132a, 132b so that the burner assembly may be slidably disposed and supported in the apertures 132a, 132b of the end plates 102a, 102b without the need of a separate burner support element.

The burner 262 has a plurality of ports 286 provided therethrough preferably disposed uniformly about or proximate to the top surface along the length of the burner 262.

The igniter control 266 and the gas control 270 both are preferably proximate one of the ends of the burner 262 and as shown in FIGS. 12 and 22A-22H. The igniter is secured in place (as will be discussed further herein) proximate to the end of the burner 262 where the igniter and gas controls are provided. The igniter 264 is connected to the igniter control 266 by the connecting wire 268 in order to receive signals from the igniter control 270.

As shown in FIGS. 1-2 and 13-14, the heater 100 includes a canopy assembly 320. The canopy assembly 320 is preferably formed of two opposing canopy side panels 322a, 322b and a canopy top member 324 having two substantially flat panel portions 325a, 325b extending oppositely and upwardly such that the top member 324 has a substantially v-shaped cross section. The canopy top member 324 preferably is configured to nest and be selectively secured atop the corresponding v-shaped recesses atop the end plates 102a and 102b. Canopy side members 322a, 322b are substantially of an arcuate cross-section and are each preferably hingedly attached along one of a corresponding pair of side edges of the canopy top member 324. Canopy sides may be attached to the canopy top by a plurality of interlocking tabs and slots, hinges, or any suitable known mechanism to connect the top edges of the canopy side pieces with one of the lateral edges of the canopy top component. Alternatively, the canopy assembly 320 may be configured to be one solid piece with the canopy sides fixedly attached to said canopy top member. Preferably, each side member of the canopy has an inner facing concave side 323 opposing the concave inner facing side of the oppositely disposed canopy side member when said side members are attached in place to said canopy top.

As best shown in FIGS. 2, and 15-19 the heater 100 includes an emitter assembly 360. The emitter assembly 360 is preferably formed of a plurality of preferably identical emitter members 362. More preferably, the emitter assembly is formed of fourteen emitter members 362. Each emitter member 362 has an inner surface and an outer surface, and is preferably formed of metal, preferably stainless steel. Each emitter member 362 is preferably formed of perforated stainless steel such that each emitter member 362 has a plurality of small perforations provided therethrough. Each emitter member 362 is preferably formed of a panel 370. The panel 370 has opposite upper and lower edges 371, 373. From the upper edge to the lower edge, the panel first curves outwardly and then inwardly, generally in a parabolic configuration, as illustrated in FIGS. 2 and 15. It is to be understood that the panel need not actually be continuously curved, but rather may be formed of a plurality of straight portions joined together to provide the generally curved appearance of the panel.

Figure 18:
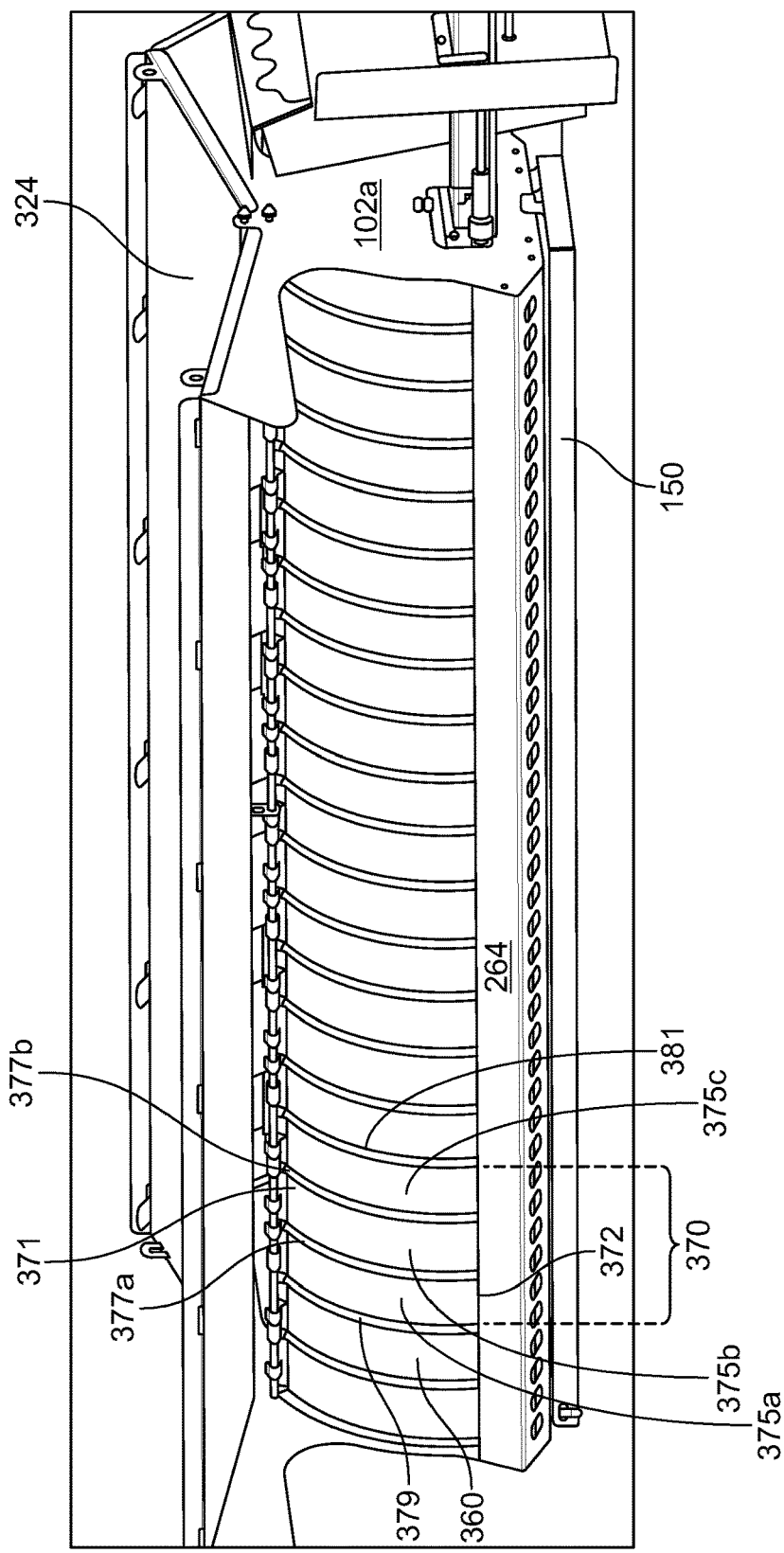
FIG. 18 is an another alternate partially cutaway side perspective view of the heater of the present invention showing the emitters in position.

As best shown in FIG. 18, each panel 370 is preferably formed of three main portions 375 a-c and two connecting portions 377 a, b. The first main portion 373 a extends from left to right from to the first connecting portion 377 a, which extends to the second main portion 375 b, which extends to the second connecting portion 377 b, which extends to the third main portion 375 c. The main portions 375 a-c curve in the manner described from the upper edge to the lower edge. The connecting portions 377 a, b also curve in the manner described from the upper edge to the lower edge.

As best illustrated in FIGS. 2 and 18, each panel 370 preferably has a first arcuate flange 379 extending outwardly from the first end thereof and a second arcuate flange 181 extending outwardly from an opposite side edge thereof. The arcuate flanges are preferably extending outwardly in a generally perpendicular manner and the flanges are also preferably curved from the upper edge to the lower edge, in the same manner in which the panel is curved.

As best illustrated in FIGS. 2 and 16, each panel 370 preferably has a plurality of flanges 383 (more preferably three flanges 383) extending outwardly from the lower edge thereof. More preferably, each main section 375 has one flange 383 extending outwardly from a lower edge thereof. The flanges 383 are preferably extending outwardly in a generally angled manner. Furthermore, if desired, the flanges 383 could be formed as a single flange extending from the lower edge of the panel.

As best shown in FIGS. 15 and 18, each panel 370 preferably has a plurality of upper flanges 385 extending from an upper edge thereof. Each upper flange 385 preferably has a lower planar portion 387 which extends angularly outwardly from an upper edge of a main portion 375. Each upper flange further preferably has a curved upper portion 389 which curves upwardly, first inwardly and then outwardly, from the lower planar portion. Each curved upper portion 389 may have a planar portion 391 provided at the free edge thereof. The lower planar portions 387 of the upper flanges 385 are all preferably planar to one another. Likewise, the curved upper portions 389 of the flanges are all preferably identical to one another, with the exception of the location from which they extend from the lower planar portions.

As best shown in FIGS. 2, 15 and 16, the heater 100 includes an inner core assembly 420. The inner core assembly 420 is preferably formed of a plurality of identical inner core members 422 (more preferably seven core members 422) with each inner core member 422 preferably being formed of a pair of inner core base portions 423 a, b. Each inner core base portion 423 has an inner surface 425 and an outer surface 427, and is preferably formed of metal, preferably stainless steel. Each inner core base portion 423 a, b is preferably formed of perforated stainless steel such that each inner core base portion 423 a, b has a plurality of holes provided therethrough. Each inner core base portion 423 a, b preferably includes an inner core panel assembly 430. Each panel assembly 430 has opposite upper 433 and lower edges 435. Each panel assembly 430 preferably comprises three panels where a lower edge of panel 440 is connected to the upper edge of panel 442 and a lower edge of panel 442 is connected to an upper edge of panel 444.

In a preferred embodiment, and as best illustrated in FIG. 15 panel 440 extends downwardly from the upper edge 436 to panel 442, panel 442 is angled downwardly and outwardly to panel 444, and panel 444 is angled downwardly and inwardly to the lower edge 438.

The lower edge of panel 444 is preferably stepped at approximately its midway point across its width, such that a first portion 429 of the lower edge extends further outwardly from the panel 442 than does a second portion 431 of the lower edge 442.

As seen in FIG. 15 a pair of folded-over portions 445 are preferably formed from the panel 444. Each folded-over portion 445 forms a notch 447 in proximate the lower edge 442. Preferably, each folded-over portion extends upwardly and inwardly from the inner surface of the panel and then curves to extend downwardly and outwardly back toward the inner surface of the panel, such that a slot 449 is defined by the folded-over portion.

As best illustrated in FIGS. 15-16 a pair of flanges 451 preferably extend from the upper edge of panel 440. The flanges 451 are preferably identical to one another. Each flange 451 preferably has a lower planar portion 453 and a curved upper portion 455. The lower planar portion 453 is preferably planar with panel 440. Curved upper portion 455 preferably curves upwardly, first inwardly and then outwardly, from the lower planar portion 453. The curved upper portion may have a planar portion 457 provided at the free edge thereof.

Figure 23:
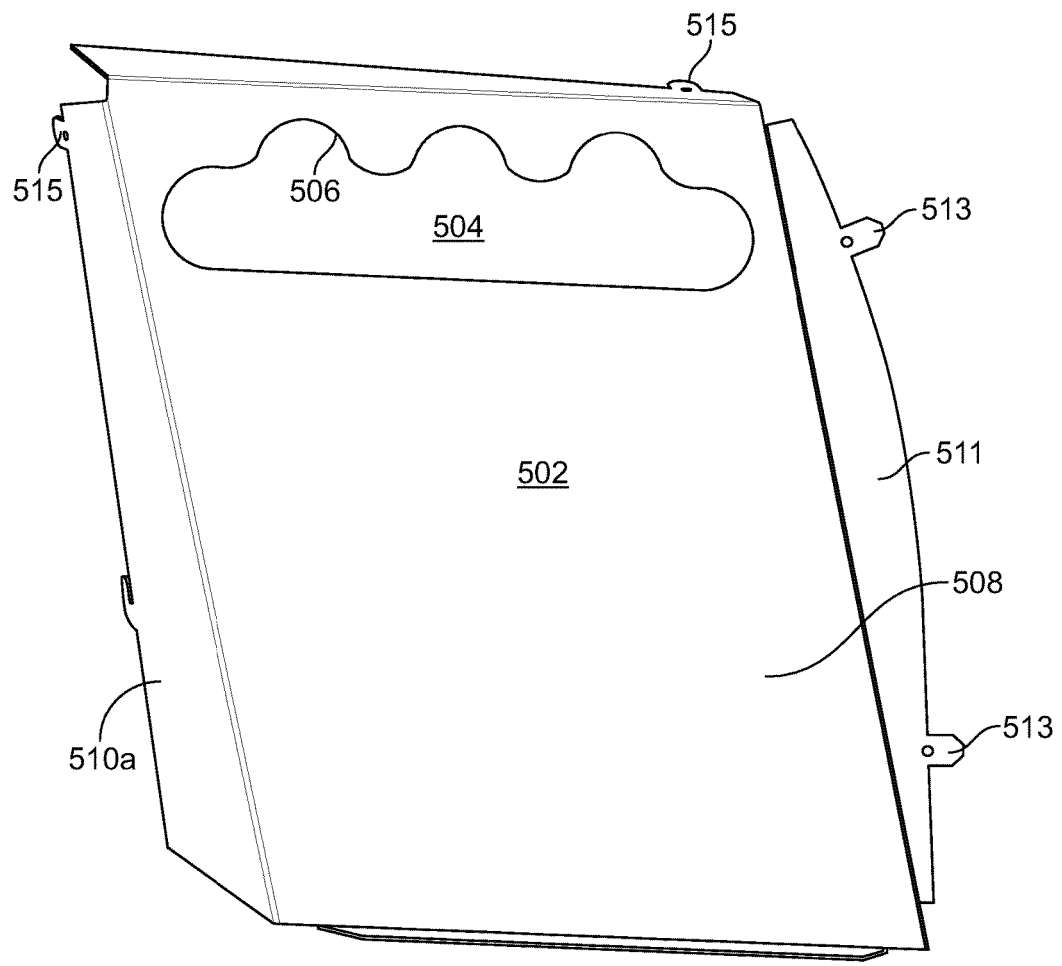
FIG. 23 is a perspective view of one of the right end reflector panels of the heater of the present invention.
Figure 24:
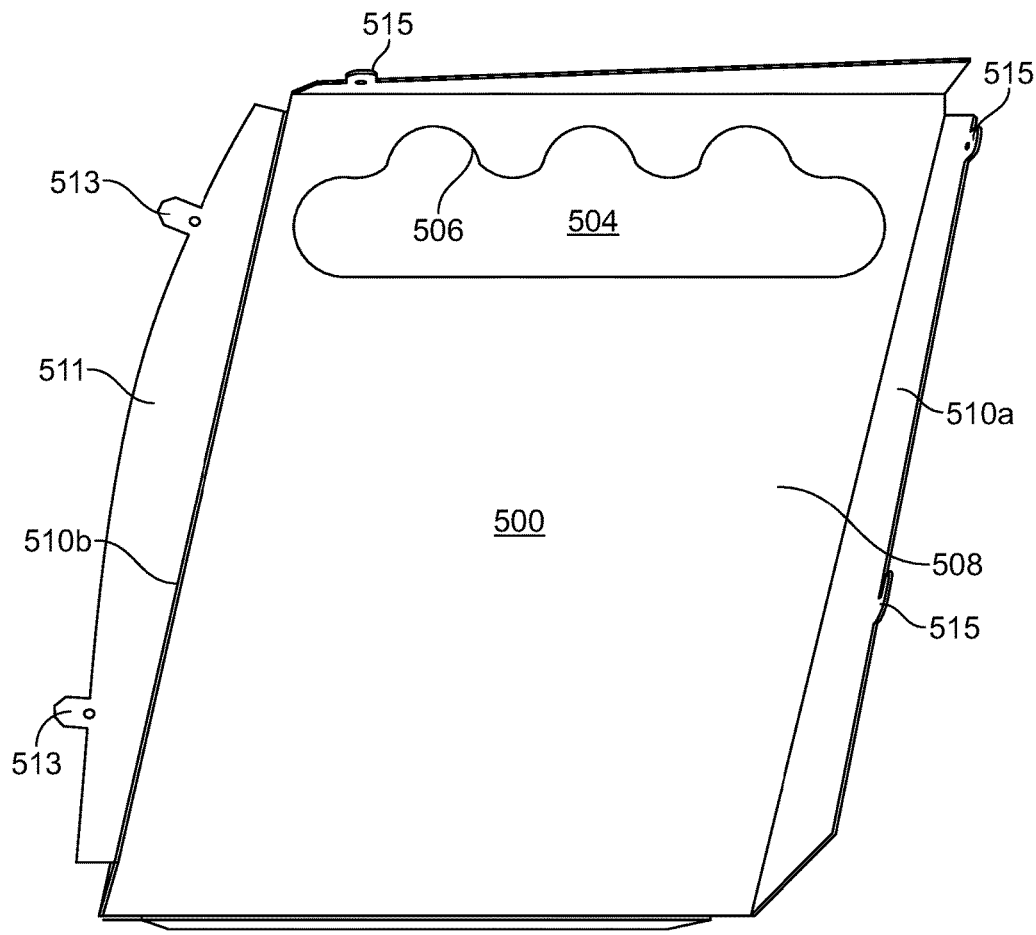
FIG. 24 is a perspective view of one of the right end reflector panels of the heater of the present invention.

As shown in FIGS. 2, and 23-24, the heater 100 preferably further comprises one or more pairs of end deflectors 500 and 502. More preferably, the heater comprises a pair of left end deflectors 500 and a pair of right end deflectors 502. Preferably, each left end deflector 500 is attached to a corresponding left arm portion of an end plate and each right end deflector is attached to a corresponding right arm portion of an end plate. As such, each left end deflector is disposed opposite from a corresponding right end deflector and separated by substantially the length of the heater 100. Similarly, each left end deflector is disposed next to the other right end deflector and separated by the central portion of the end plate to which both deflectors are attached. Each left and right deflector preferably includes an elongated aperture 504 to permit airflow therethrough. More preferably, the elongated aperture includes a top edge 506 of substantially sinusoidal configuration. Each left and right deflector further comprise a central panel 508 having an inner surface.

The central panels each extend downwardly and outwardly as shown in the figures such that the top edge of each central panel is substantially adjacent the end plate to which it is attached and a bottom edge of each central panel is displaced from the end plate. Each left and right deflector further preferably comprise first and second side panels 510a, 510b wherein side panels are of a substantially triangular configuration to facilitate the displacement described above. Additionally, the outermost side panel 510a or 510b of each deflector 500, 502 preferably comprises an extension panel 511 extending perpendicularly therefrom. Preferably, the extension panel 511 includes one or more tabs 513 to facilitate the connection of the deflector to a corresponding side panel 322a or 322b. More preferably, the outer edge of the extension panels 511 are arcuate and correspond with the curvature of the inner surface 323 of the side panel. The deflectors also preferably comprise tabs 515 adapted to be received and supported within corresponding slots 517 of an end panel 102.

Figure 21A:
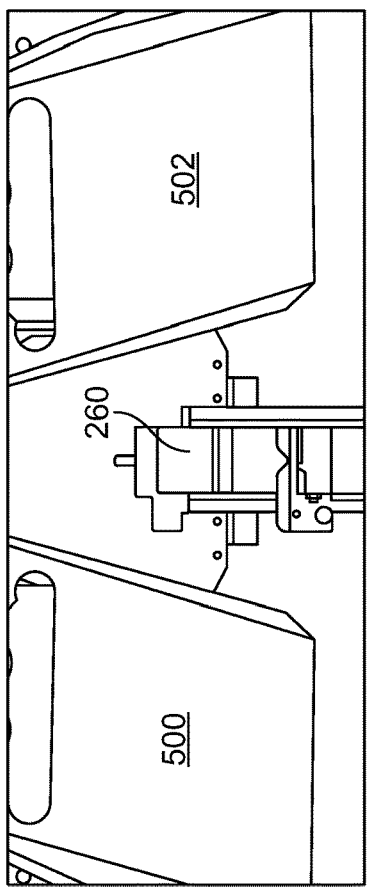
FIGS. 21A-21H depict the process for aligning and installing the burner assembly using the burner aligning bracket and bottom pan.
Figure 21B:
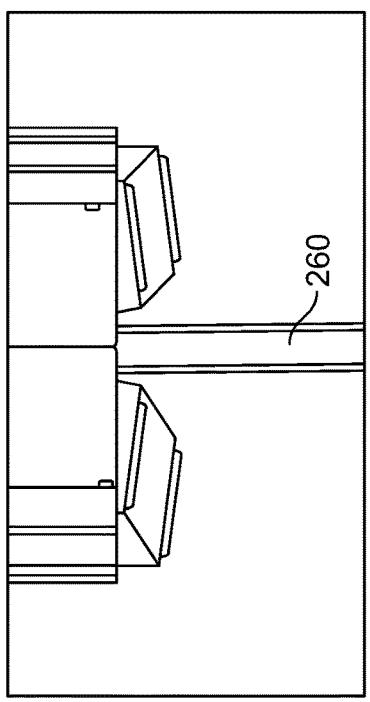
Figure 21C:
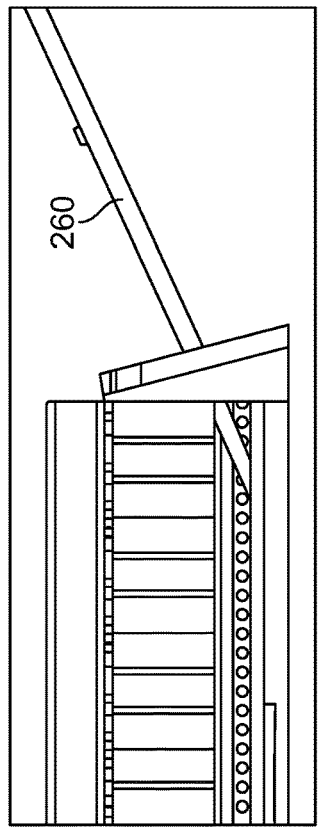
Figure 21D:
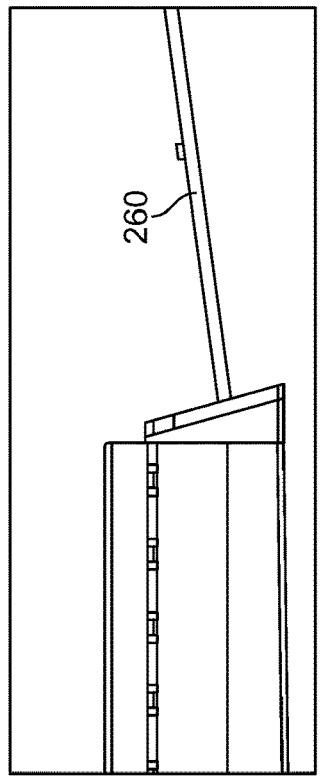
Figure 21F:
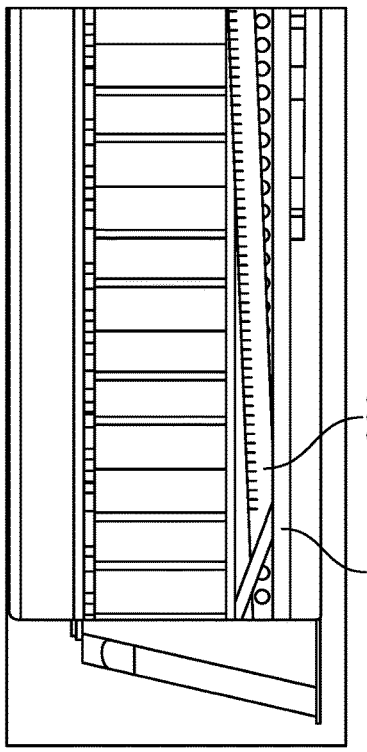
Figure 21E:
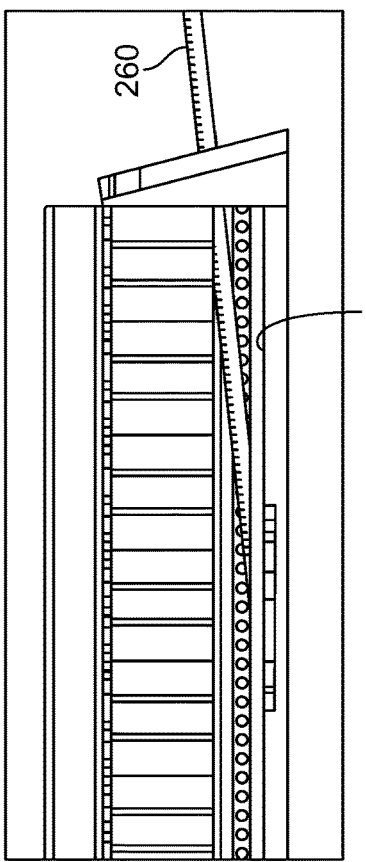
Figure 21H:
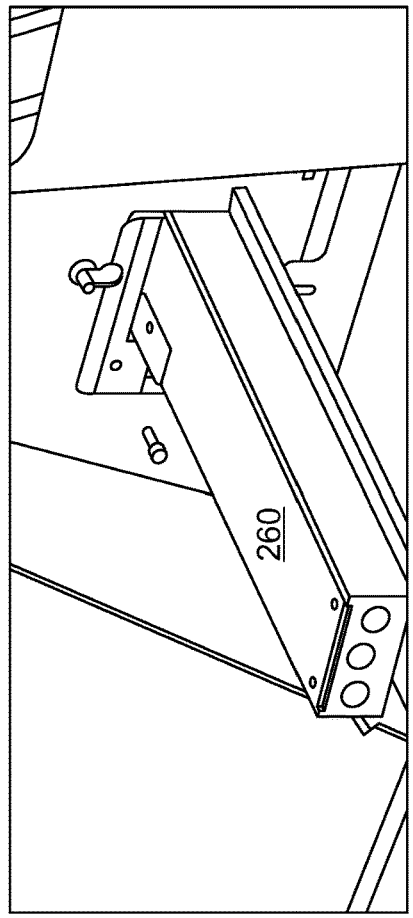
Figure 21G:
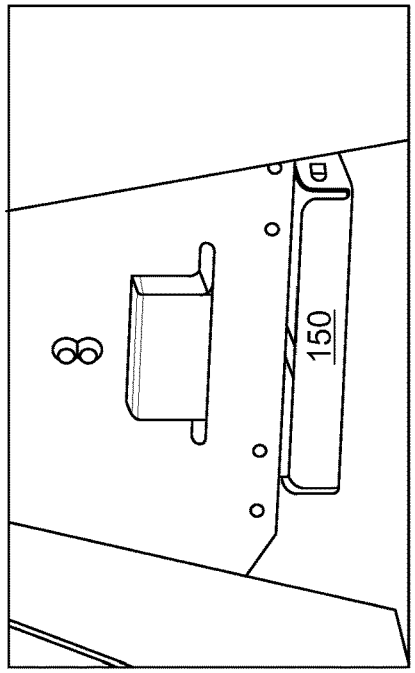
Figure 22A:
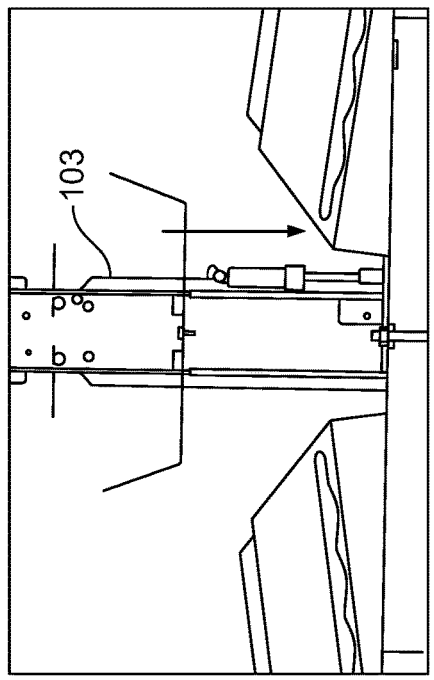
FIGS. 22A-22H depict the process for aligning and installing the igniter and control assembly.
Figure 22B:
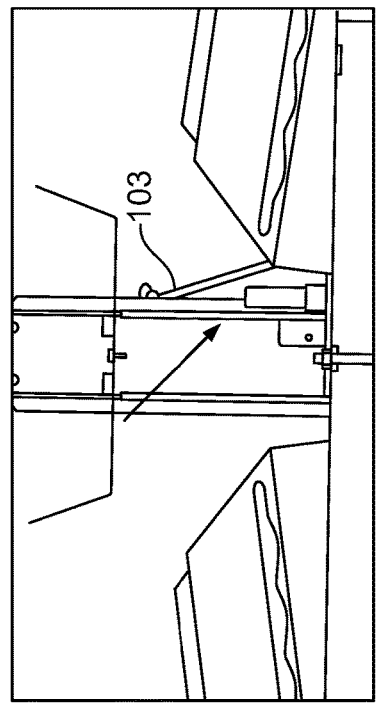
Figure 22C:
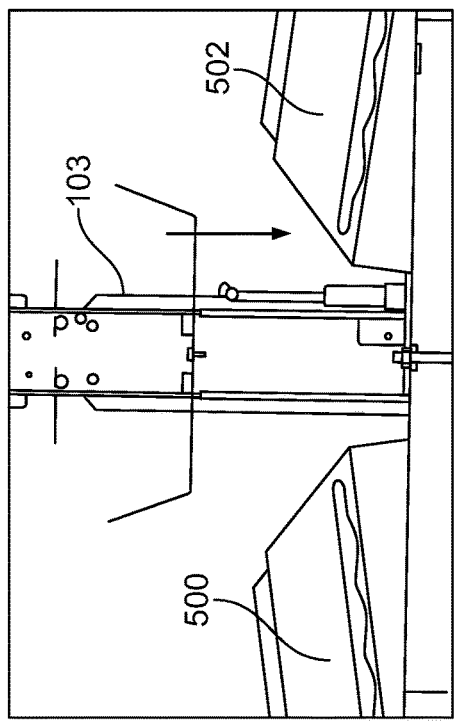
Figure 22D:
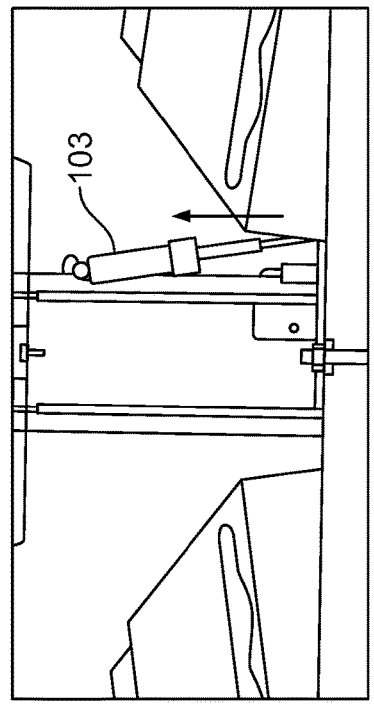
Figure 22F:
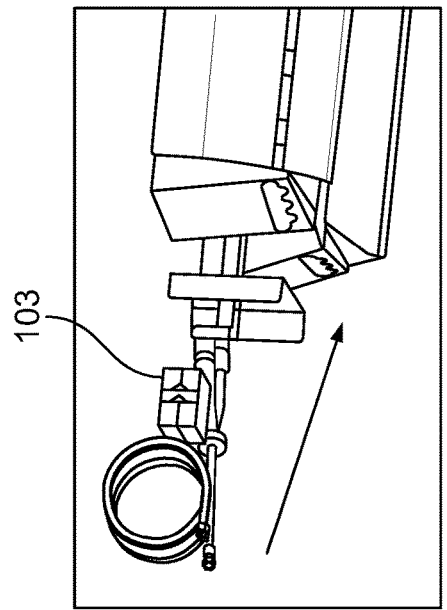
Figure 22H:
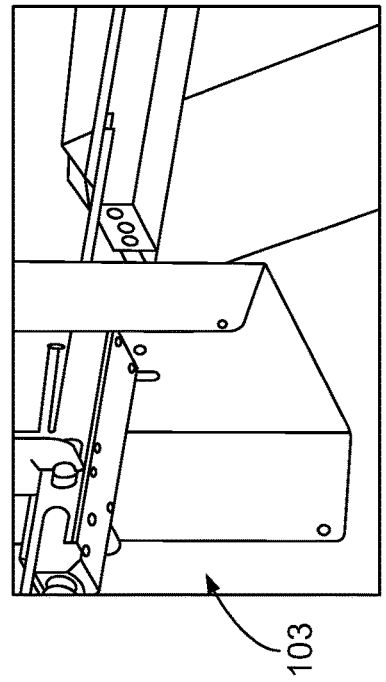
Figure 22E:
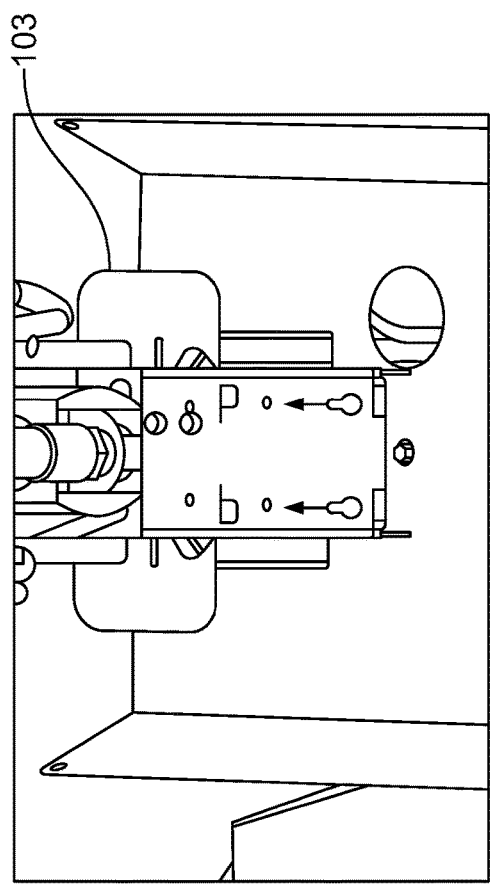
Figure 22G:
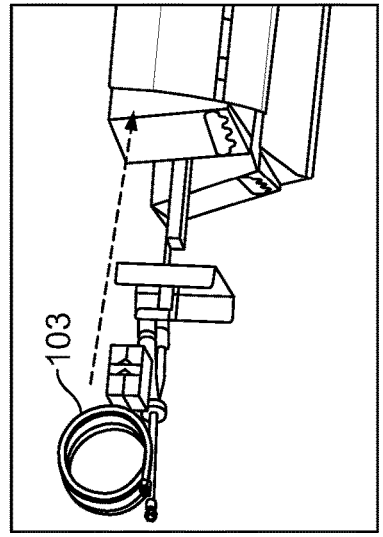
Figure 25:
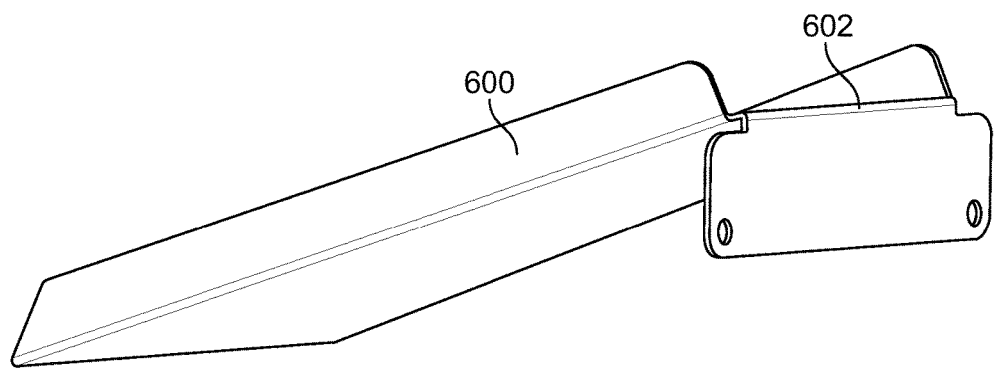
FIG. 25 is a perspective view of the burner alignment bracket of the heater of the present invention.

As shown in FIGS. 21F and 25 the, heater assembly 100 further includes a ramped burner alignment bracket 600 having a top edge 602 disposed adjacently with and just below an opening 132 of one of the end plates. When installed, the ramped burner alignment bracket 600 extends downwardly from the end plate at an angle and abuts the top surface of the pan member 150.

The heater 100 includes a plurality of fastener assemblies to selectively attach components of the heater 100. Each fastener assembly preferably comprises a nut and a bolt although any conventional fastener assemblies may also be used to connect the various parts of the heater as desired.

The installation of the burner assembly 260 within the body of the heater 100 will now be described with reference to FIGS. 21A-H. To install the burner within the body of the heater 100, the burner assembly 260 is slid between one of the pairs of right and left end deflectors 500, 502 while keeping the burner aligned substantially along the longitudinal axis of the heater. While installing the burner, the burner is preferably tilted downwardly as it is being inserted such that it abuts the bottom pan 150 as it moves along the length of the heater. As the first inserted end contacts the burner alignment bracket 600, that first end traverses upwardly and centrally along the bracket as the bracket is designed with tapered sides that are of substantially a width apart corresponding to the width of the burner assembly to ensure that the first inserted end of the burner assembly passes through the aperture 132b of the end plate 102 b which is abutting the burner alignment bracket. After the first end of the burner assembly is in the aperture 132 of the first end plate, it may be tightened into place with fastener assemblies such as a screw. The other end of the burner assembly may then be slid through the end plate 102a with that plate then being locked into position as well such that the burner assembly is then installed at a desired distance above the hingedly attached pan 150.

The attachment of the emitter supports 204 to the end plates 201a, 102b will now be discussed. The first end 206 of one emitter support 204 is positioned against the inner surface 114 of the end plate 102a. Aperture 236 of the tab 228 of the emitter support 204 is positioned into alignment with aperture 140a of the end plate 102a, and aperture 238 of the tab 230 of the emitter support 204a is positioned into alignment with aperture 138a of the end plate 102a. The bolt of one of the fastener assemblies is then inserted through the apertures 140a, 236 and nut is secured to the bolt, thereby rotatably securing the emitter support 204 to the end plate 102a.

The other emitter support 204 is next secured to the end plate 102a. The second end 208 of the emitter support 204 is positioned against the inner surface 114 of the end plate 102a. Aperture 240 of the tab 232 of the emitter support 204b is positioned into alignment with aperture 140b of the end plate 102a, and aperture 242 of the tab 234 of the emitter support 204b is positioned into alignment with aperture 138b of the end plate 102a. The bolt of one of the fastener assemblies is then inserted through the apertures 140b, 240 and nut is secured to the bolt, thereby rotatably securing the second emitter support 204 to the end plate 102a.

As best seen in FIGS. 15 and 16, each inner core member 422 of the inner core assembly 420 is formed by coupling an inner core base portion 423a with a corresponding inner core base portion 423b. The coupling of the inner core base portions 423a, 423b together results in the following: the inner surface of panel 440 of inner core base portion 423a being positioned against, or at least facing, the inner surface of panel 440 of inner core base portion 423b; the second portion 431 of the panel 444 of the inner core base portion 423a being positioned against the inner surface of panel 444 of the inner core base portion 423b; the second portion 431 of the panel 444 of the inner core base portion 423b being positioned against the inner surface of panel 444 of the inner core base portion 423a; the lower planar portion 453 of the flange 451 of the inner core base portion 423a positioned adjacent to the lower planar portion 453 of the flange 451 of the inner core base portion 423b; the lower planar portion 453 of the flange 451 of the inner core base portion 423b positioned adjacent to the lower planar portion 453 of the flange 451 of the inner core base portion 423a; the folded-over portion 445 of the inner core base portion 423a positioned adjacent to the folded-over portion 445 of the inner core base portion 423b; and the folded-over portion 445 of the inner core base portion 423a positioned adjacent to the folded-over portion of the inner core base portion 423a. The inner core base portions 423a, 423b are preferably coupled together in the foregoing manner to form one inner core member 422, with the inner core base portions 423a, 423b being held together by a friction fit or the like.

The coupling of the inner core base portions 423a, 423b in this manner forms first and second flange pairings, with first flange pairing being formed of one set of the adjacent flanges 451, and the second flange pairing being formed of the other set of the adjacent flanges 451. The curved upper portions 455 of the adjacent flanges are curved in opposite manners to provide a slot 477 therebetween. The first and second flange pairings are separated from one another by a gap.

The coupling of the inner core base portions 423a, 423b in this manner also forms first and second fold-over pairings, with first fold-over pairing being formed of one set of the adjacent fold-over portions and the second fold-over pairing being formed of the other set of the adjacent fold-over portions 445. The slots 449 of the adjacent fold-over portions, form a semi-continuous slot. The first and second fold-over pairings are separated from one another by a gap. The other inner core members 422 are formed and configured in an identical manner as described above so as to form the inner core assembly 420.

Once assembled, inner core members 422 are then positioned in place relative to the rods 244. More specifically, as shown in FIG. 15, inner core members 422 are secured about rods 244 by having a rod 244 be inserted through the semi-continuous slots 449 of the fold-over pairings of each inner core member 422 and by having an additional rod 244 be inserted through the slots of the flange 451 pairings of the inner core members 422. The inner core members 422 are moved along the rods 244 until first inner core member 422 is positioned against, or in close proximity to, the inner surface 114 of the end plate 102a. With the first inner core member 422 in place, the other inner core members are similarly secured to the rods 244 in an adjacent and sequential fashion.

With the inner core members 422 in place about the rods 244, the inner core assembly 420 of the heater 100 is formed. The inner core assembly 420 is generally positioned above the burner assembly and as described supported by rods 244 which are in turn supported by end plates 102a, 102b.

Discussion of installation of the emitter members 362 follows as shown best in FIGS. 15-16. Emitter members 362 are positioned in place relative to rod 244, the inner core members 422, and the emitter support 204a. More specifically, the flanges 385 of each emitter member 362 are inserted through the gaps defined by the inner core members 422 and under the rod 244 such that the curved upper portions 389 of the flanges 385 can be positioned about the rod, thereby rotatably securing the emitter members 362 to the rod 244.

With the emitter members 362 rotatably secured to the rod 244b, and with the emitter support 204 rotatably secured to the end plate 102a, the emitter members 362 and the emitter support 204a are manipulated in order to position the flanges 383 on the lower edges of the emitter members 362 within the channel 226 of the emitter support 204a.

With the flanges 383 of the emitter members 362 positioned in the channel 226 of the emitter support 204a, aperture 238 of the tab 230 of the emitter support 204a is positioned into alignment with aperture 138a of the end plate 102a. The bolt of one of the fastener assemblies is then inserted through the apertures 138a, 238 and a nut is secured to the bolt, thereby fixedly securing the emitter support 204a to the end plate 102a. The emitter members 362 are thus held in place by the emitter support 204a, but are preferably not connected to any portion of the emitter support 204a, so as to allow for, and to accommodate, expansion/contraction of the emitter members 362 during operation.

Next, and in a similar manner, oppositely disposed emitter members 362 are positioned in place relative to the rod 244b, the inner core members 422, and the emitter support 204b. More specifically, the flanges of the emitter members are inserted through the gaps defined by the inner core members 422, and under the rod 244b such that the curved upper portions of the flanges can be positioned about the rod 244b, thereby rotatably securing the emitter members 362 to the rod 244b.

With the opposite set of emitter members 362 rotatably secured to the rod 244b, and with the emitter support 204b rotatably secured to the end plate 102a, the emitter members 362 and the emitter support 204b are manipulated in order to position the flanges 383 of the opposite emitter members 362 within the channel 226 of the emitter support 204b.

With the flanges of the opposite emitter members 362 positioned in the channel 226 of the emitter support 204b, aperture 242 of the tab 234 of the emitter support 204b is positioned into alignment with aperture 138b of the end plate 102a. The bolt of one of the fastener assemblies is then inserted through the apertures 138b, 242 and nut 492 is secured to the bolt, thereby fixedly securing the emitter support 204b to the end plate 102a. The opposite emitter members 362 are thus held in place by the emitter support 204b, but are preferably not connected to any portion of the emitter support 204b, so as to allow for, and to accommodate, expansion/contraction of the emitter members 362 during operation.

With the emitter members 362 in place about the rod 244b and in the channel 226 of the emitter support 204a, and with the opposite emitter members 362 in place about the rod 244b and in the channel 226 of the emitter support 204b, the emitter assembly 360 of the heater 100 is formed. With reference to the portion of the rod 244b about which are provided the first set of emitter members 362 and the first inner core member 422, the order of flanges (beginning most proximate to the end plate 102a) is: the curved upper portion of flange of emitter member the first emitter member 362, the curved upper portion of flange of emitter member opposite the first emitter member, first flange pairing of inner core member, the curved upper portion of flange of opposite emitter member, the curved upper portion of flange of first emitter member, second flange pairing of inner core member 422a, the curved upper portion of flange of first emitter member 362, and the curved upper portion of flange of opposite emitter member 362.

With regard to the emitter support 204b, the first end 206 of the emitter support 204b is positioned against the inner surface 114 of the end plate 102b. Aperture 236 of the tab 228 of the emitter support 204b is positioned into alignment with aperture 140a of the end plate 102b, and aperture 238 of the tab 230 of the emitter support 204b is positioned into alignment with aperture 138a of the end plate 102b. Bolts of two of the fastener assemblies are then inserted through the apertures 140a, 236; 138a, 238, respectively, and nuts are secured to the bolts, thereby fixedly securing the emitter support 204b to the end plate 102b. The heater 100 is thus formed and ready for use.

The operation of the heater 100 will now be described. The heater 100 is intended to be positioned above a space which is to be heated. In a preferred embodiment, the heater 100 is intended to be suspended from the ceiling or trusswork of an agricultural house, such as a poultry house, in order to heat a predetermined area of the floor or ground of the agricultural house. The heater 100 is suspended by wires, cables or the like which are secured to the ceiling or trusswork. The wires may pass through the apertures 164a, 164b of the upwardly extending portions 158a, 158b of the end plates 102a, 102b. Thus, the heater 100 can be suspended above the floor of the agricultural house at a predetermined distance by the wires. If desired, the wires may be winchable so as to allow for a change in the position of the heater 100 relative to the floor The heater 100 must also have a power source and a gas line connected thereto, so as to provide both power and fuel to the heater 100. These steps are well-known in the heating industry and, therefore, further explanation regarding same will not be provided.

With the heater 100 receiving both power and fuel, the heater 100 is turned on and the gas provided by the gas line to the burner assembly is ignited by the igniter.

Advantageously, the heater 100 preferably has an overall capacity/size of at least 100 k BTU per unit, thus providing for up to a 25% increase in the BTUs per unit as compared to known prior art heaters. As described above, the heater 100 has redesigned components and emitting surfaces which provide improved and more homogenous heat reflectance as compared to the prior heaters.

Figure 20:
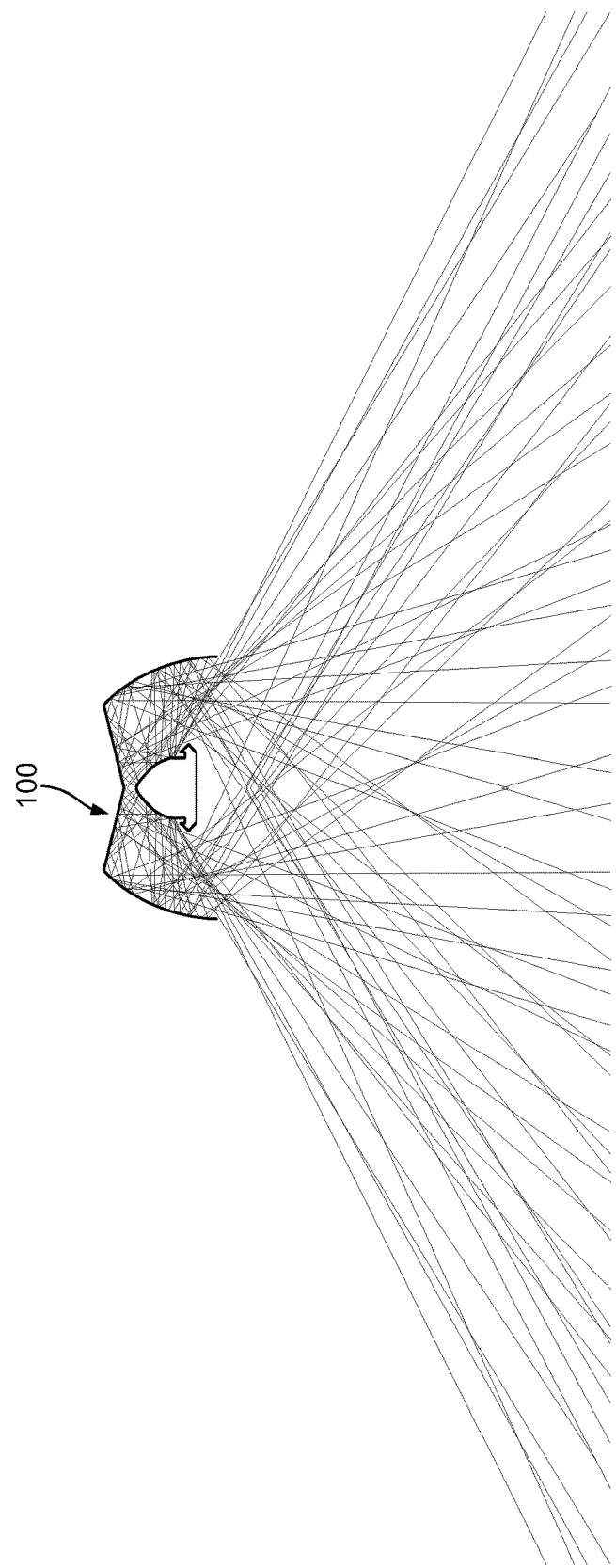
FIG. 20 shows a side graphical depiction of an exemplary heat distribution footprint of the heater of the present invention.

The heater 100 provides for improved reflectance infrared heat distribution and wider heat and more uniform heating footprints as compared to known prior art heaters due in part to the parabolic reflective surfaces of the canopy walls and directed inner surfaces of the end reflectors as shown in FIG. 20. Thus, the heater 100 has more even distribution and a larger heating footprint and elevated temperatures as compared to the prior art known heaters allowing for fewer units to be utilized in order to efficiently heat a given space.

The burner assembly of the heater 100 is preferably provided with sealed electronic components which allow for the heater 100 as a whole to be capable of being washed down under high pressure.

The inner core assembly of the heater 100 provides additional improvements compared to the inner core of prior art heaters, not only in connection with the ease of the formation of the individual inner core members, but also in connection with the ease of the formation of the inner core assembly as a whole. The configuration and assembly of the inner core assembly further results in substantial cost savings across various levels.

The emitter assembly of the heater 100 provides improvements compared to the emitter of the heater 100. The emitter assembly is easily formed during assembly and, therefore, results in substantial cost savings across various levels.

The emitter assembly of the heater 100 has flanges on each individual emitter member. The flanges as shown are provided at an angle relative to the general emitting surfaces further enhancing the overall reflectivity and resultant emittance of the heater 100, and further enhancing and providing for the formation of a substantially quadrangular zone of heating provided on the floor below the heater 100. The geometry of the inner core and emitter assemblies of the heater 100 are such that they enhance the burn efficiency of the fuel, thereby creating the realized higher infrared heat output as compared with prior art heaters.

While preferred embodiments of the present invention are shown and described, it is envisioned that those skilled in the art may devise various modifications of the present invention.

What is claimed is:

1. A radiant heater comprising:
   an end plate;
   an elongated burner having a length and being connected to the end plate;
   an inner core assembly operatively connected to the end plate via a supporting rod,
      wherein the inner core assembly comprises a flange that contacts the rod during normal operation of the heater,
      wherein the inner core assembly is comprised of opposing inner core base portions that are both directly connected to the rod during normal operation of the heater;
   an elongated emitter support having a length and being connected to the end plate, wherein the length of the emitter support is adjacent to and extends along the length of the burner; and
   a substantially arcuate emitter assembly having a lower edge, an upper edge, and a height, wherein the lower edge of the emitter assembly is connected to the elongated emitter support, and wherein the height of the emitter assembly extends away from the emitter support such that the lower edge is beside the burner and the upper edge is above the burner;
   wherein the emitter assembly is configured to reflect heat emitted by the burner assembly.

2. The radiant heater of claim 1, wherein the emitter assembly further comprises a surface and a plurality of substantially arcuate flanges, wherein each flange has a height that extends along the height of the emitter assembly, and wherein each flange has a width that extends perpendicularly away from the surface of the emitter assembly and toward the burner.

3. The radiant heater of claim 1, further comprising a canopy assembly connected to the end plate and having a concave surface facing the burner.

4. The radiant heater of claim 1, further comprising a deflector connected to the end plate.

5. The radiant heater of claim 4, wherein the deflector is provided at an acute angle relative to the end plate.

6. The radiant heater of claim 1, further comprising an igniter and control assembly connected to the burner.

7. The radiant heater of claim 1, further comprising a bottom pan hingedly attached to the end plate and comprising a ramped burner alignment bracket configured to align the burner in the radiant heater.

8. A radiant heater configured to be positioned above a floor at a predetermined distance and to produce a generally quadrilaterally shaped infrared heat footprint, the radiant heater comprising:
   first and second end plates both having inner and outer surfaces;
   an elongated burner having a length, extending between the inner surfaces of the first and second end plates, and being secured to at least one of the end plates;
   first and second elongated emitter supports each having a respective length, the first and second elongated emitter supports extending between the inner surfaces of the first and second end plates and being secured to at least one of the end plates, wherein the respective lengths of the emitter supports are adjacent to and extend along the length of the burner; and
   a substantially arcuate emitter assembly comprising a plurality of substantially arcuate emitter assembly flanges, a lower edge, an upper edge, and a height, wherein the lower edge of the emitter assembly is connected to at least one of the elongated emitter supports, and wherein the height of the emitter assembly extends away from the emitter support; and
   an inner core assembly operatively connected to at least one of the end plates,
      wherein the inner core assembly further comprises a plurality of inner core assembly flanges and,
      wherein the inner core assembly is operatively connected to at least one of the end plates via a supporting rod,
      wherein the inner core assembly flanges contact the rod during normal operation of the heater, and
      wherein the inner core assembly further comprises opposing inner core base portions that are both directly connected to the rod during normal operation of the heater.

9. The radiant heater of claim 8, wherein the emitter assembly further comprises a surface and wherein each emitter assembly flange has a height that extends along the height of the emitter assembly, and wherein each emitter assembly flange has a width that extends perpendicularly away from the surface of the emitter assembly and toward the burner.

10. The radiant heater of claim 8, further comprising a canopy assembly connected to at least one of the end plates and having a concave surface facing the burner.

11. The radiant heater of claim 8, further comprising a deflector connected to at least one of the end plates.

12. The radiant heater of claim 11, wherein the deflector is provided at an acute angle relative to at least one of the end plates.

13. The radiant heater of claim 8, further comprising an igniter and control assembly connected to the burner.

14. The radiant heater of claim 8, further comprising a bottom pan hingedly attached to at least one of the end plates and comprising a ramped burner alignment bracket configured to align the burner in an aperture defined by one of the end plates.

* * * * *

UNITED STATES PATENT AND TRADEMARK OFFICE
CERTIFICATE OF CORRECTION

| | |
|---|---|
| PATENT NO. | : 10,473,324 B2 |
| APPLICATION NO. | : 15/802654 |
| DATED | : November 12, 2019 |
| INVENTOR(S) | : Schubert et al. |

It is certified that error appears in the above-identified patent and that said Letters Patent is hereby corrected as shown below:

In the Specification

Column 6, Line 66-67, delete "Each emitter member 362 is preferably formed of panel 370" and insert therefore --Each panel 370 is preferably formed of three emitter members 362--.

Signed and Sealed this
Seventeenth Day of May, 2022

*Katherine Kelly Vidal*

Katherine Kelly Vidal
*Director of the United States Patent and Trademark Office*